(12) United States Patent
Medaghri Alaoui et al.

(10) Patent No.: US 11,537,356 B2
(45) Date of Patent: *Dec. 27, 2022

(54) METHODS AND DEVICES FOR ADJUSTMENT OF THE ENERGY LEVEL OF A PLAYED AUDIO STREAM

(71) Applicant: SPOTIFY AB, Stockholm (SE)

(72) Inventors: Souheil Medaghri Alaoui, New York City, NY (US); Miles Lennon, New York City, NY (US); Kieran Del Pasqua, New York City, NY (US)

(73) Assignee: Spotify AB, Stockholm (SE)

( * ) Notice: Subject to any disclaimer, the term of this patent is extended or adjusted under 35 U.S.C. 154(b) by 45 days.

This patent is subject to a terminal disclaimer.

(21) Appl. No.: 16/933,573

(22) Filed: Jul. 20, 2020

(65) Prior Publication Data

US 2021/0173615 A1   Jun. 10, 2021

Related U.S. Application Data

(63) Continuation of application No. 14/714,148, filed on May 15, 2015, now Pat. No. 10,719,290.

(51) Int. Cl.
*G06F 3/16* (2006.01)
*H04N 21/6587* (2011.01)
(Continued)

(52) U.S. Cl.
CPC .............. *G06F 3/165* (2013.01); *H04L 65/60* (2013.01); *H04N 21/233* (2013.01);
(Continued)

(58) Field of Classification Search
CPC .............. H04L 65/60; H04N 21/47217; H04N 21/8113; H04N 21/233; H04N 21/6587; G06F 3/165
(Continued)

(56) References Cited

U.S. PATENT DOCUMENTS 6,938,209 B2   8/2005   Ogawa et al.
7,650,570 B2   1/2010   Torrens et al.
(Continued)

FOREIGN PATENT DOCUMENTS

JP     2006227710 A  *  8/2006
WO    WO2014/001913     3/2014

OTHER PUBLICATIONS

Alaqui, Office Action, U.S. Appl. No. 14/714,148, dated Oct. 20, 2016, 14 pgs.
(Continued)

*Primary Examiner* — Melur Ramakrishnaiah
(74) *Attorney, Agent, or Firm* — Morgan, Lewis & Bockius LLP

(57) ABSTRACT

This disclosure concerns the playback of audio, e.g. in the form of music. More particularly, the disclosure concerns the playback of streamed audio. In one example embodiment, there is a method of operating an electronic device for playback of an audio stream. While an audio stream is being played, for example at a user interface of the electronic device, a first request to adjust an energy level (e.g., a tempo) of the played audio stream is received. In response to receiving the first request, the energy level (e.g., the tempo) of the played audio stream is adjusted.

15 Claims, 16 Drawing Sheets

(51) Int. Cl.
   *H04N 21/233*   (2011.01)
   *H04N 21/81*    (2011.01)
   *H04N 21/472*   (2011.01)
   *H04L 65/60*    (2022.01)
(52) U.S. Cl.
   CPC ... *H04N 21/47217* (2013.01); *H04N 21/6587* (2013.01); *H04N 21/8113* (2013.01)
(58) Field of Classification Search
   USPC .......................................................... 700/94
   See application file for complete search history.

(56) References Cited

U.S. PATENT DOCUMENTS

| | | | |
|---|---|---|---|
| 7,711,838 B1 | 5/2010 | Boulter et al. | |
| 9,195,383 B2 | 11/2015 | Garmark et al. | |
| 2004/0267952 A1 | 12/2004 | He et al. | |
| 2006/0122842 A1 | 6/2006 | Herberger et al. | |
| 2006/0224260 A1 | 10/2006 | Hicken et al. | |
| 2006/0236847 A1 | 10/2006 | Wilhop | |
| 2007/0162876 A1 | 1/2007 | Quirk | |
| 2007/0100481 A1 | 5/2007 | Toms et al. | |
| 2008/0250315 A1 | 10/2008 | Eronen et al. | |
| 2009/0063414 A1* | 3/2009 | White | G06F 16/24 |
| 2009/0089327 A1 | 4/2009 | Kalaboukis et al. | |
| 2011/0004330 A1 | 1/2011 | Rothkopf et al. | |
| 2011/0035033 A1* | 2/2011 | Friedenberger | H04N 21/4398 |
| | | | 700/94 |
| 2011/0246508 A1 | 10/2011 | Maekawa et al. | |
| 2012/0311443 A1 | 12/2012 | Chaudhri et al. | |
| 2012/0315012 A1 | 12/2012 | Mees | |
| 2013/0086519 A1 | 4/2013 | Fino | |
| 2013/0167029 A1 | 6/2013 | Friesen et al. | |
| 2013/0174204 A1* | 7/2013 | Coburn, IV | H04N 21/6581 |
| | | | 725/78 |
| 2013/0205243 A1 | 8/2013 | Rivera et al. | |
| 2013/0211565 A1 | 8/2013 | Kimoto | |
| 2014/0006483 A1 | 1/2014 | Garmark et al. | |
| 2014/0059430 A1 | 2/2014 | White et al. | |
| 2014/0180762 A1 | 6/2014 | Gilbert | |
| 2014/0280181 A1 | 9/2014 | Rodger et al. | |
| 2014/0281972 A1 | 9/2014 | Kramer et al. | |
| 2014/0359444 A1 | 12/2014 | Greenberg-Sanders et al. | |
| 2015/0309844 A1* | 10/2015 | Lowe | G06F 3/0481 |
| | | | 715/716 |
| 2016/0048589 A1* | 2/2016 | Modi | G06Q 30/0207 |
| | | | 707/769 |
| 2018/0197158 A1 | 1/2018 | Smalley et al. | |

OTHER PUBLICATIONS

Alaqui, Final Office Action, U.S. Appl. No. 14/714,148, dated Jul. 28, 2017, 15 pgs.
Alaqui, Office Action, U.S. Appl. No. 14/714,148, dated Jan. 4, 2018, 16 pgs.
Alaqui, Final Office Action, U.S. Appl. No. 14/714,148, dated Sep. 28, 2018, 17 pgs.
Alaqui, Office Action, U.S. Appl. No. 14/714,148, dated Apr. 5, 2019, 16 pgs.
Alaqui, Notice of Allowance, U.S. Appl. No. 14/714,148, dated Feb. 20, 2020, 8 pgs.
Notice of Allowance dated May 5, 2017 issued by United States Patent and Trademark Office on U.S. Appl. No. 14/839,458, 9 pages.
Office Action dated May 31, 2016 issued by United States Patent and Trademark Office on U.S. Appl. No. 14/839,458, 24 pages.
Office Action dated Jul. 13, 2017 issued by United States Patent and Trademark Office on U.S. Appl. No. 14/839,427, 18 pages.
Office Action dated Sep. 27, 2017 issued by United States Patent and Trademark Office on U.S. Appl. No. 14/714,145, 15 pages.
Office Action dated Nov. 17, 2017 issued by United States Patent and Trademark Office on U.S. Appl. No. 14/839,440, 16 pages.
Office Action dated Feb. 20, 2019 issued by United States Patent and Trademark Office on U.S. Appl. No. 15/707,090, 20 pages.
Office Action dated Oct. 31, 2019 issued by United States Patent and Trademark Office on U.S. Appl. No. 15/707,090, 17 pages.
Office Action dated Mar. 18, 2020 for U.S. Appl. No. 15/707,090, 20 pages.
Office Action dated Dec. 14, 2017 issued by United States Patent and Trademark Office on U.S. Appl. No. 14/714,153, 19 pages.
Office Action dated Feb. 11, 2016 issued by United States Patent and Trademark Office on U.S. Appl. No. 14/839,427, 15 pages.
Office Action dated Dec. 18, 2015 issued by United States Patent and Trademark Office on U.S. Appl. No. 14/839,440, 15 pages.
Office Action dated Nov. 25, 2015 issued by United States Patent and Trademark Office on U.S. Appl. No. 14/839,458, 21 pages.
Office Action dated Mar. 30, 2018 for U.S. Appl. No. 14/839,427, 20 Pages.
Office Action dated Mar. 7, 2017 issued by United States Patent and Trademark Office on U.S. Appl. No. 14/714,145, 11 pages.
Office Action dated Mar. 10, 2017 issued by United States Patent and Trademark Office on U.S. Appl. No. 14/839,440, 14 pages.

\* cited by examiner

METHODS AND DEVICES FOR ADJUSTMENT OF THE ENERGY LEVEL OF A PLAYED AUDIO STREAM

CLAIM OF PRIORITY

This application is a continuation of and claims the benefit of priority to U.S. patent application Ser. No. 14/714,148, titled "METHODS AND DEVICES FOR ADJUSTMENT OF THE ENERGY LEVEL OF A PLAYED AUDIO STREAM", filed May 15, 2015, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure generally relates to the providing of media, and more particularly to the streaming of media. In particular, the embodiments described herein relate to methods and electronic devices for playback of an audio stream, e.g. in the form of music.

BACKGROUND

As computer technology has improved, the digital media industry has evolved greatly in recent years. Users are able to use electronic devices such as mobile communication devices (e.g., cellular telephones, smart phones, tab let computers, etc.) to consume music, video and other forms of media content. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than receiving a complete file in physical media (such as a CD or a DVD, or downloading the entire file) before consuming the media content.

At social gatherings, users often wish to share media content with friends, relatives, and new acquaintances. For example, a party host may access media content on a portable electronic device, such as a mobile phone or a tablet computer, and present media content through a media presentation system (e.g., play music on one or several speakers or stream video on a screen).

SUMMARY

It is in view of the above considerations and others that the various embodiments disclosed herein have been made.

It is a general object of the embodiments described herein to allow for an improved way of controlling playback of media, such as music, e.g. at social gatherings.

This general object has been addressed by the appended independent claims. Advantageous embodiments are defined in the appended dependent claims.

In a first of its aspects, this disclosure concerns a method of operating an electronic device for playback of an audio stream. While an audio stream is being played (e.g., at a user interface of the electronic device, or alternatively through loudspeaker(s) that is/are remotely controlled by the electronic device), a first request to adjust an energy level of the played audio stream in accordance with a user preference is received. In response to receiving this first request, the energy level of the played audio stream is adjusted in dependence of the user preference.

In some embodiments, the energy level of the played audio stream is indicative of an intensity of the played audio stream. In one advantageous embodiment, the energy level of the played audio stream is indicative of a tempo of the played audio stream. The tempo of the played audio stream may be defined as the speed, or pace, at which the audio stream is being played. For example, the tempo may be measured in Beats Per Minute (BPM).

According to some embodiments, adjusting the energy level of the played audio stream in dependence of the user preference may comprise sending a data message including an instruction to a computer server system to manipulate the energy level of the audio stream that is being played; and in response thereto receiving the audio stream with a manipulated energy level. Furthermore, the method may comprise playing the audio stream with the manipulated energy level.

In some advantageous embodiments, the method additionally comprises displaying a visual array of selectable user preference options at the user interface, wherein each selectable user preference option is associated with a respective mood and wherein each selectable user preference option is further associated with a predefined energy level. The method may comprise receiving an instruction to select one of the selectable user preference options. Adjusting the energy level of the played audio stream may hence be performed, or carried out, in response to receiving the instruction to select one of the selectable user preference options.

For example, adjusting the energy level of the audio stream may include: sending a data message to a computer server system, the data message comprising a) information about a selected user preference option, b) information about the energy level associated with the selected user preference option, and c) an instruction to manipulate the energy level of the audio stream that is being played in accordance with the energy level associated with the selected user preference option; and in response thereto receiving the audio stream with the manipulated energy level.

In a second of its aspects, this disclosure concerns a method of adjusting an energy level of an audio stream. The method is performed by a computer server system including one or several computer servers. The method comprises: receiving, from an electronic device, a data message including an instruction to manipulate the energy level of an audio stream that is being played; manipulating the energy level of said audio stream; and in response thereto streaming, or otherwise communicating, said audio stream with the manipulated energy level to the electronic device.

In some embodiments, the energy level of the audio stream that is being played is indicative of an intensity of the audio stream. In one advantageous embodiment, the energy level of the audio stream that is being played is indicative of a tempo of the audio stream. The tempo of the audio stream that is being played may be defined as the speed, or pace, at which the audio stream is being played. For example, the tempo may be measured in Beats Per Minute (BPM).

In one embodiment, the method may also comprise receiving a data message from the electronic device, wherein the data message comprises a) information about a selected user preference option, b) information about the energy level associated with the selected user preference option, and c) an instruction to manipulate the energy level of the audio stream that is being played in accordance with the energy level associated with the selected user preference option. Manipulating the energy level of said audio stream may hence comprise manipulating the energy level to correspond to said energy level associated with the selected user preference option.

In some embodiments, manipulating the energy level of said audio stream may comprise performing an acoustic analysis of the audio stream being played to determine an energy level parameter associated with the audio stream being played; and manipulating the determined energy level parameter to give the audio stream being played a different energy level parameter associated with a different energy level. For example, performing the acoustic analysis of the audio stream being played may further comprise sensing, or otherwise determining, one or several acoustical parameters associated with the audio stream being played; and determining the energy level parameter on the basis of said sensed, or otherwise determined, acoustical parameters.

In a third of its aspects, this disclosure concerns an electronic device for playback of an audio stream. The electronic device comprises a user interface, a processor and a memory. The electronic device may also comprise a transmitter and a receiver, or alternatively a transceiver.

In one embodiment, the memory stores computer program code, which, when run in the processor causes the electronic device to, while an audio stream is being played: receive a first request to adjust an energy level of the played audio stream in accordance with a user preference, and in response to receiving the first request, adjust the energy level of the played audio stream in dependence of the user preference.

In some embodiments, the energy level of the played audio stream is indicative of an intensity of the played audio stream. In one advantageous embodiment, the energy level of the played audio stream is indicative of a tempo of the played audio stream. The tempo of the played audio stream may be defined as the speed, or pace, at which the audio stream is being played. For example, the tempo may be measured in Beats Per Minute (BPM).

In some embodiments, the memory stores computer program code, which, when run in the processor causes the electronic device to: send, by means of the transmitter, a data message including an instruction to a computer server system to manipulate the energy level of the audio stream that is being played; and receive, by means of the receiver, the audio stream with a manipulated energy level.

For instance, the memory may also store computer program code, which, when run in the processor causes the electronic device to play the audio stream with the manipulated energy level at the user interface.

Furthermore, in some embodiments, the memory stores computer program code, which, when run in the processor causes the electronic device to: display, at the user interface, a visual array of selectable user preference options, wherein each selectable user preference option is associated with a respective mood and wherein each selectable user preference option is further associated with a predefined energy level; and receive an instruction to select one of the selectable user preference options; wherein adjusting the energy level of the played audio stream is performed in response to receiving the instruction to select one of the selectable user preference options. For example, in one embodiment, the memory may also store computer program code, which, when run in the processor causes the electronic device to: send, by means of the transmitter, a data message to a computer server system, the data message comprising a) information about a selected user preference option, b) information about the energy level associated with the selected user preference option, and c) an instruction to manipulate the energy level of the audio stream that is being played in accordance with the energy level associated with the selected user preference option; and receive, by means of the receiver, the audio stream with the manipulated energy level.

In a fourth of its aspects, this disclosure concerns a computer server system including one or several computer servers for adjusting an energy level of an audio stream. The computer server system may comprise at least one communications interface including a transmitter and a receiver (or, alternatively, a transceiver), at least one processor, and at least one memory.

In one embodiment, the at least one memory stores computer program code, which, when run in the at least one processor causes the computer server system to: receive, by means of the communications interface, a data message including an instruction from an electronic device to manipulate the energy level of an audio stream that is being played; manipulate the energy level of said audio stream; an in response thereto stream, by means of the communications interface, said audio stream with the manipulated energy level to the electronic device.

In one embodiment, the at least one memory stores computer program code, which, when run in the at least one processor causes the computer server system to: receive, by means of the communications interface, a data message from the electronic device, the data message comprising a) information about a selected user preference option, b) information about the energy level associated with the selected user preference option, and c) an instruction to manipulate the energy level of the audio stream that is being played in accordance with the energy level associated with the selected user preference option; wherein manipulating the energy level of said audio stream comprises manipulating the energy level to correspond to said energy level associated with the selected user preference option.

For example, in accordance with one embodiment, the at least one memory stores computer program code, which, when run in the at least one processor causes the computer server system to: perform an acoustic analysis of the audio stream being played to determine an energy level parameter associated with the audio stream being played; and manipulate the determined energy level parameter to give the audio stream being played a different energy level parameter associated with a different energy level. In one embodiment, the at least one memory may further store computer program code, which, when run in the at least one processor causes the computer server system to: sense, or otherwise determine, one or several acoustical parameters of the audio stream being played; and determine the energy level parameter on the basis of said sensed, or otherwise determined, acoustical parameters.

In a fifth of its aspects, this disclosure concerns a computer program, comprising instructions which, when executed on at least one processor, cause the at least one processor to carry out the method according to first aspect. A carrier comprising the computer program according to the fifth aspect may also be provided. The carrier may for example be one of an electronic signal, an optical signal, a radio signal, or a computer readable storage medium.

In a sixth of its aspects, this disclosure concerns a computer program, comprising instructions which, when executed on at least one processor, cause the at least one processor to carry out the method according to second aspect. A carrier comprising the computer program according to the sixth aspect may also be provided. The carrier may for example be one of an electronic signal, an optical signal, a radio signal, or a computer readable storage medium.

Various embodiments described herein allow a user of an electronic device to dynamically control the energy level (e.g., the tempo) of a played audio stream (e.g., a song) on the basis of a user preference. In some advantageous embodiments, the user preference includes a mood. Thus, in one example scenario, a party host (i.e., a user) may dynamically control the tempo of currently played songs on the basis of the current mood of the people at a social gathering such as at a party. This may improve the experience of social gatherings such as parties. According to some embodiments, it may also be possible to influence the mood of people at a social gathering. For example, if a party host wishes to change the mood of the people at a social gathering, he or she may in some embodiments select a mood option to adjust the energy level of the played songs.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for playback of audio streams, e.g. songs, may be inadequate. It is therefore a general object of the embodiments described herein to allow for an improved playback of audio streams.

To address this, in accordance with an embodiment, described herein are a method and an electronic device for playback of an audio stream. While an audio stream is being played, a first request to adjust an energy level of the played audio stream in accordance with a user preference (e.g., a mood) is received. Furthermore, in response to receiving this first request, the energy level of the played audio stream is adjusted, or otherwise changed, in dependence of the user preference.

This way, it is made possible to enable a user of an electronic device to dynamically control the energy level (e.g., a tempo) of the played audio streams (e.g., songs) in real time and on the basis of a user preference. Thus, in one example scenario, a party host may dynamically control the tempo (e.g., in terms of the BPM) of played songs on the basis of the current mood of the people at a social gathering such as a party. This may improve the experience of social gatherings, such as parties.

Figure 1:
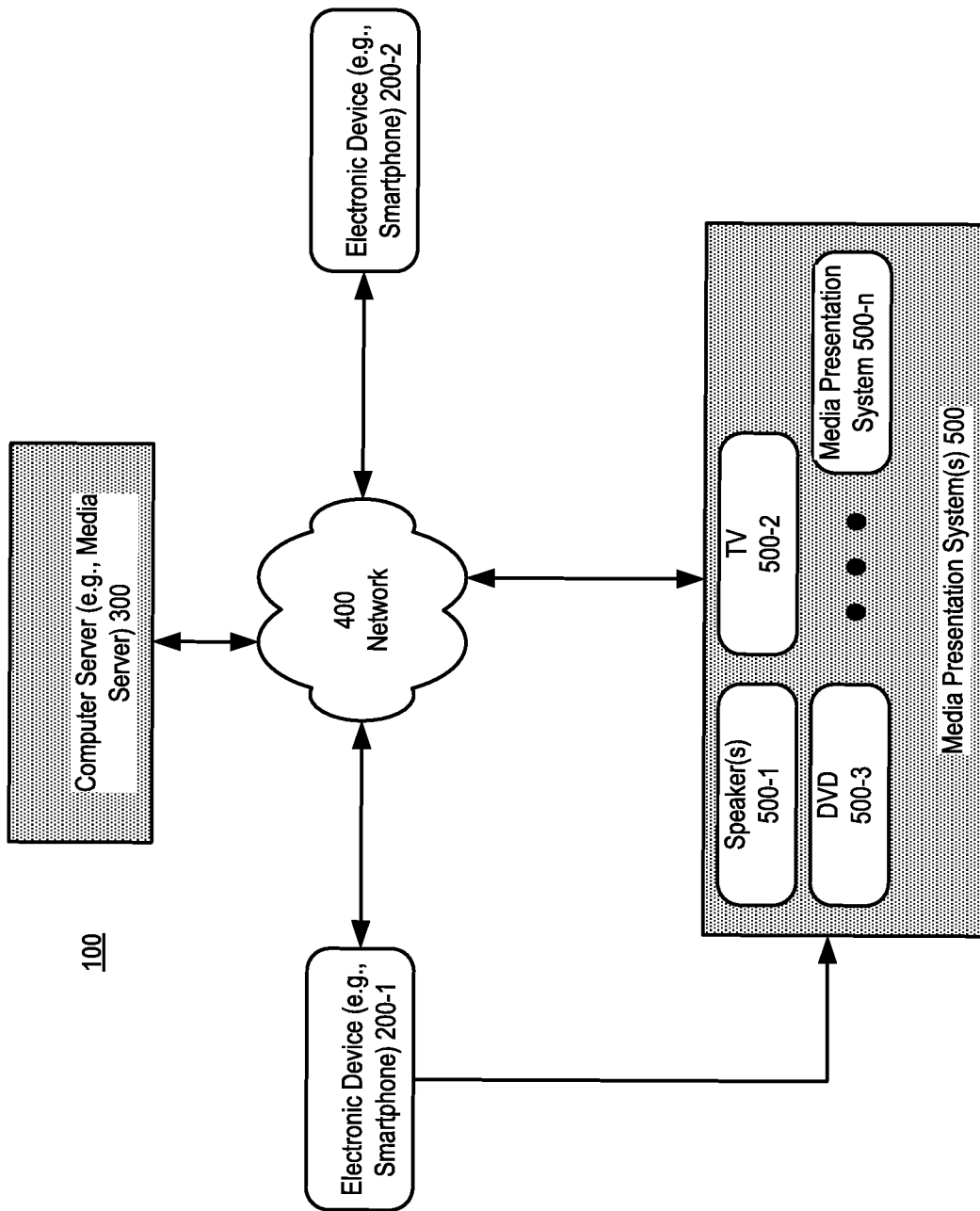
FIG. 1 is a block diagram schematically illustrating an exemplary media content delivery system in accordance with some embodiments.

FIG. 1 is a block diagram illustrating an exemplary media content delivery system 100 in accordance with some embodiments. The media content delivery 100 may comprise one or several electronic devices 200 (e.g., electronic device 200-1 and electronic device 200-2), one or more computer servers 300 (e.g., media content servers also known as media servers), and one or more media presentation systems (e.g., media presentation systems 500 including speaker(s) 500-1, television (TV) 500-2, Digital Versatile Disk (DVD) 500-3, and/or other media presentation system 500-n).

In some embodiments, the electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include any network(s) such as the Internet, other wide area networks (WAN), local area networks (LAN), virtual private networks (VPN), metropolitan area networks (MAN), peer-to-peer networks, and/or ad-hoc networks.

In some embodiments, as is illustrated in FIG. 1, the electronic device 200 (e.g., the electronic device 200-1) is capable of remotely controlling one or more of the media presentation systems 500. To this end, the electronic device 200 may for example implement, or otherwise utilize, any of the techniques described in the international patent application PCT/IB2013/001938 (published under WO 2014/001913 A2) or in U.S. Patent Application Publication No. 2014/0006483 A1, each of which are herein incorporated by reference. For example, it is possible for a user of the electronic device 200 (e.g., the electronic device 200-1 in this example) to remotely control the presentation of media at any one or a combination of the media presentation systems 500. In order to give context to the embodiments described throughout this disclosure, the international patent application PCT/IB2013/001938 and U.S. Patent Application Publication No. 2014/0006483 A1 is are incorporated herein by reference. More specifically, the electronic device 200-1 may receive a media control command for a media presentation system 500 (e.g. speaker(s) 500-1). In response to receiving this media control command, the electronic device 200-1 may send a server media control request to the computer server 300 and a local media control request to the media presentation system 500, which may located be within the same local network, e.g. a LAN, as the electronic device 200-1 (i.e., a local network to which both the electronic device 200-1 and the media presentation system 500 are connected). The server media control request may e.g. be sent to the computer server 300 over the Internet. Typically, but not necessarily, the computer server 300 may be associated with an Internet Protocol (IP) address outside the space of the local network to which both the electronic device 200-1 and the media presentation system 500 are connected. As will be appreciated, the electronic device 200-1 and the media presentation system 500 are thus associated with IP addresses within the same sub network. The electronic device 200-1 can thus provide a user interface 230 (see e.g. FIG. 2) that allows a user 600 to select media content for presentation by the electronic device 200-1 itself and, also, to generate media control request(s) to cause the media content to be presented, or played, by the media presentation system 500. Furthermore, the server media request and the local media request are both configured to cause a media control operation, performed at the electronic device 200-1, to be implemented at the media presentation system 500.

In an example scenario related to a social gathering, a host (i.e., a user) may thus interact with his or her electronic device 200-1 to remotely control the playback of media content at the media presentation system 500, e.g. the playback of audio streams (e.g., songs) through loudspeakers(s) 500-1. This way, it is for example possible for a party host (i.e., the user) to control the playback of music that is being played at a social gathering, such as a party.

Figure 2:
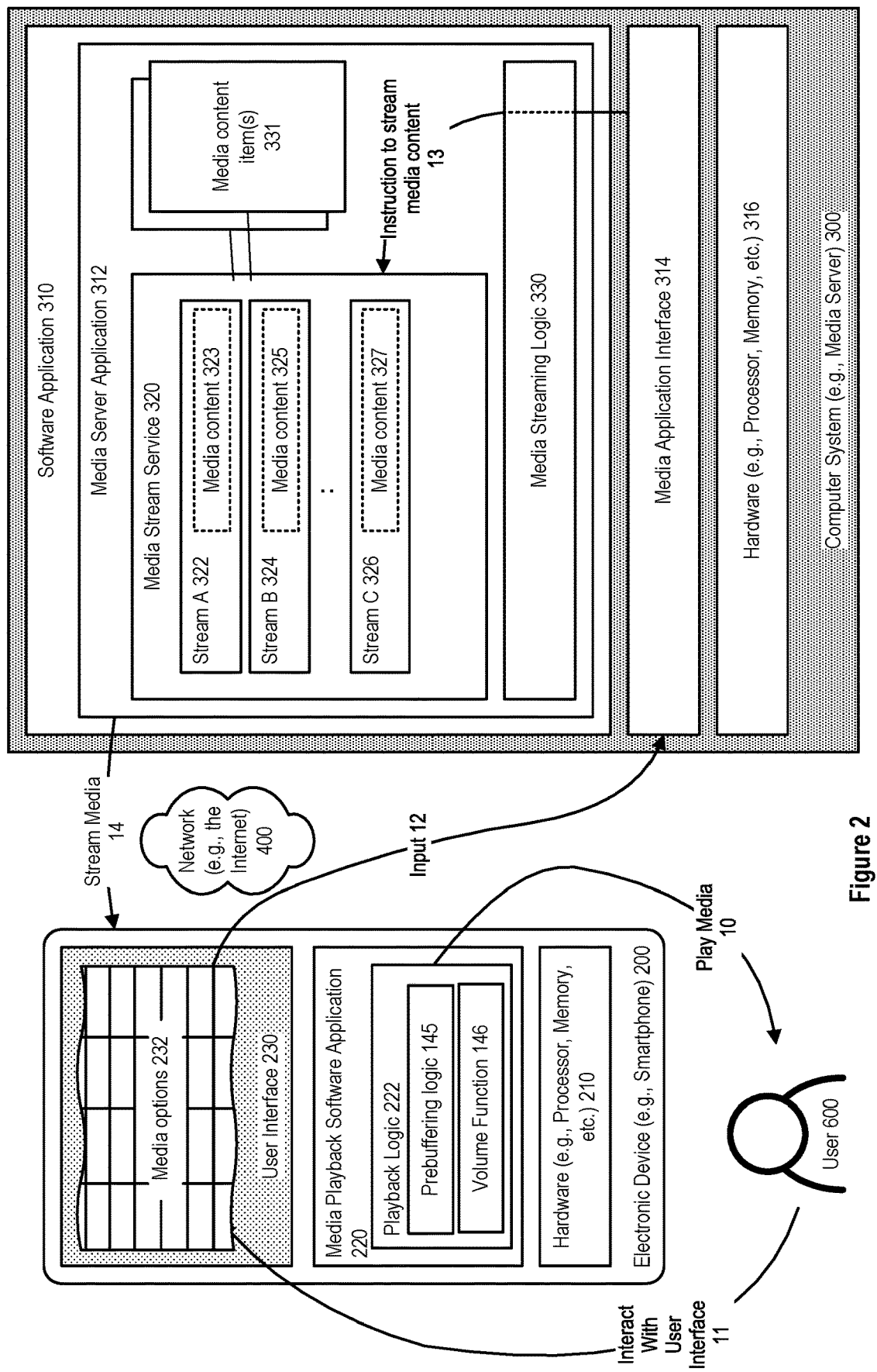
FIG. 2 illustrates an example embodiment of a system for playback of audio streams, in accordance with an embodiment.

Turning now to FIG. 2, an example environment where embodiments of this disclosure may be applied will be described. An electronic device 200, e.g. electronic device 200-1 of FIG. 1, may be communicatively connectable to the computer server 300 via the network 400, e.g. the Internet, as described hereinabove. As can be seen in FIG. 2, only a single electronic device 200 and a single computer server 300 are shown. However, the computer server 300 may support the simultaneous use of multiple electronic devices, and/or the electronic device 200 can simultaneously access media content at multiple computer servers 300. Although FIG. 2 illustrates the computer server 300 in accordance with one example embodiment, FIG. 2 is intended more as a functional description of the various features, or components, which may be present in one or more computer servers, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media content will in general be exemplified to be audio content, e.g. in form of music. This should, however, not be interpreted as limiting the scope of the various embodiments of the disclosed embodiments.

As is schematically shown in FIG. 2, the electronic device 200 may be used for the playback of media content (e.g., audio content such as music), which is provided by the computer server 300. The electronic device 200 may include one or several physical computer resources, or hardware resources 210. The hardware resources 210 may e.g. include one or several processors (or, processing circuitry), a communications interface (or, communication circuitry) and one or several memories. Likewise, the computer server 300 operating as a media server may include one or several physical computer resources, or hardware resources 316. The hardware resources 316 may likewise include one or several processors (or, processing circuitry), a communications interface (or, communication circuitry) and one or several memories.

The computer server 300 may include an operating system or other processing system which supports execution of a software application 310, including a media server application 312 which may be used, for example, to stream media content. A media stream service 320 may be used to buffer media content, for streaming to one or more media streams 322, 324, 326. A media application interface 314 may receive requests from electronic devices 200 or other systems, to retrieve media content 331 from the computer server 300.

Media content 331, or media items, may be provided, for example, within a first storage such as a memory (e.g., including a database), or may be received by the computer server 300 from another source (not shown). This another source (not shown) could be external to the computer server 300, i.e. it may be located remotely from the computer server 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230, which is adapted to display or otherwise provide a visual array of media options 232, for example as a two-dimensional grid, a list, or other visual array format, and determine a user input. Each media option in the visual array of media options 232 correspond to a respective media stream 322, 324, 326.

Selecting a particular media option within the visual array 232 may in some embodiments be used, or otherwise interpreted, as a request or instruction to the media server application 312 to stream or otherwise return a corresponding particular media content item. For example, in accordance with some embodiments, the software application 310 at the computer server 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 146, which may be used to control the playback of media content that is received from the media server application 312, for playback by the electronic device 200, as described in further detail below A user 600 may interact 11 with the user interface 230 and issue requests, for example the playing of a selected media option at the electronic device 200. The user's selection of a particular media option may be communicated 12 to the media server application 312, via the media application interface 314. The media server application 312 may then be instructed 13 to stream corresponding media content 13, including one or more streams of media content data 323, 325, 327, and subsequently stream 14 or otherwise communicate the selected media to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 600.

Figure 3A:
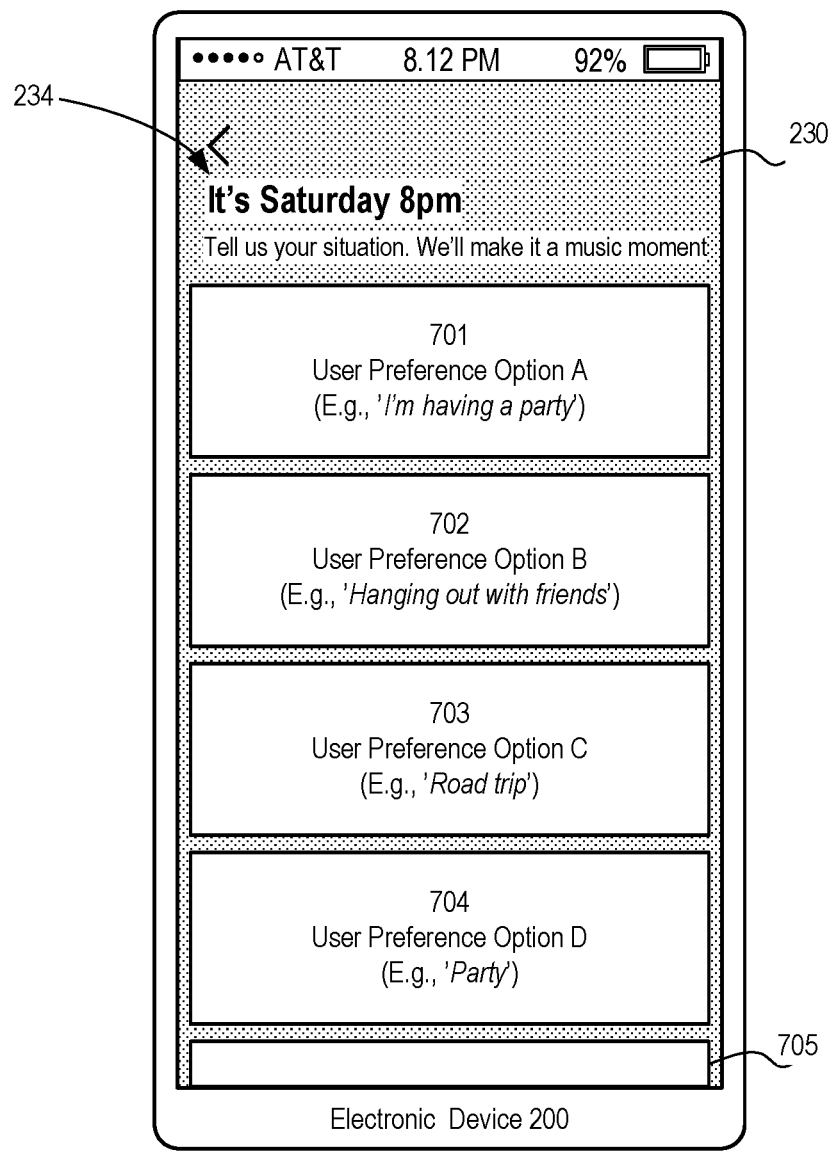
FIGS. 3A-3C schematically illustrates an example embodiment of a user interface of an electronic device, e.g. in the form of a smart phone, which supports playback of an audio stream and simultaneous dynamic control of an energy level of the audio stream.
Figure 3B:
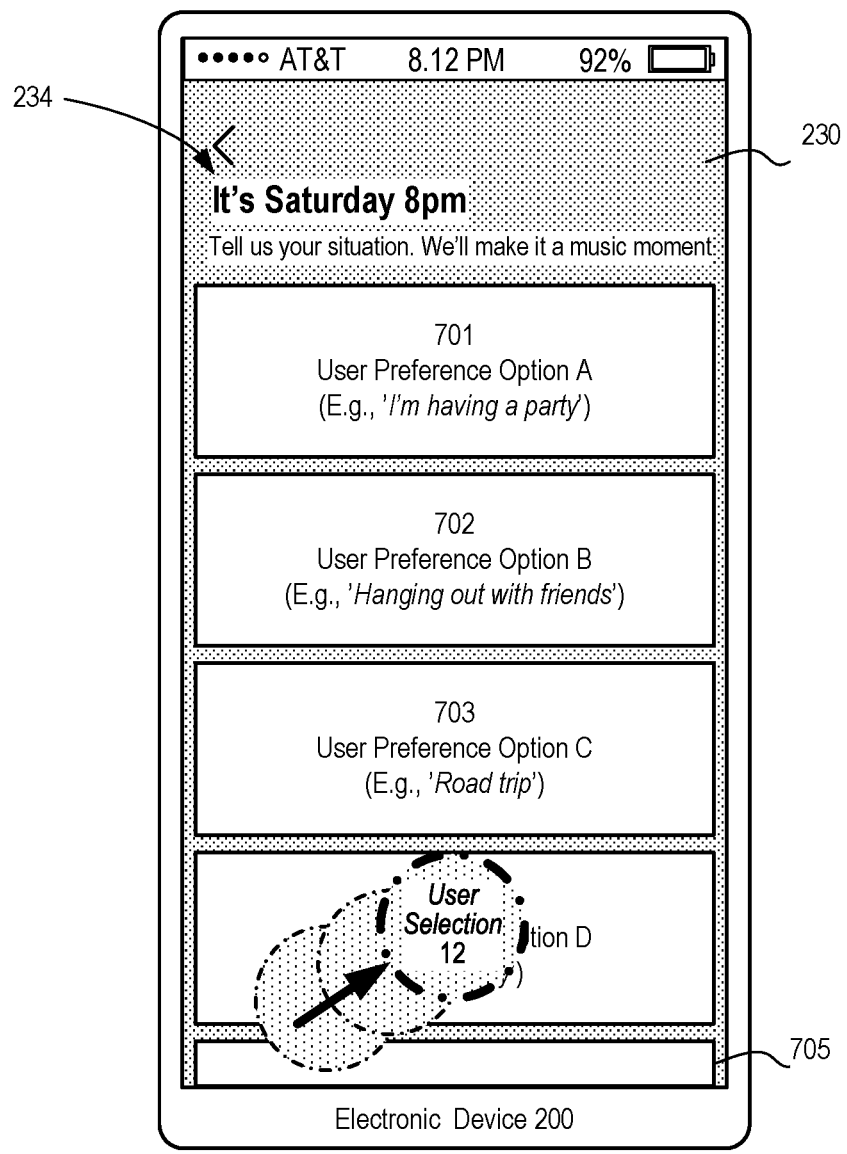
Figure 3C:
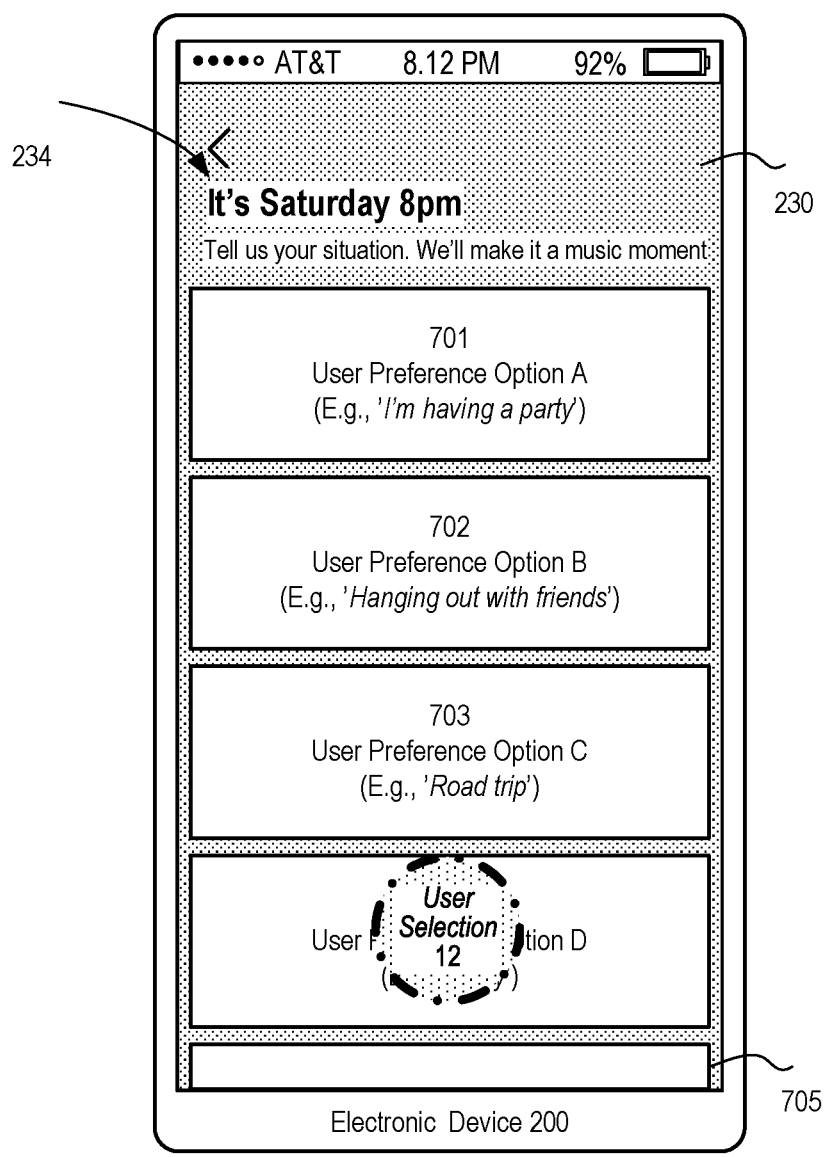

FIGS. 3A-3C illustrate an electronic device 200 which supports playback of audio streams. The electronic device 200 typically comprises a user interface 230 as described earlier with reference to FIG. 2. The user interface 230 typically includes output device(s) and input device(s), as is known and conventional in the art. In some implementations, the input devices may include a keyboard, a mouse or a track pad. Alternatively, or in addition, in some implementations, the user interface 230 includes a display that includes a touch-sensitive surface, in which case the display is a touch-sensitive display. In electronic devices 200 that have a touch-sensitive display, a soft keyboard may be displayed when keyboard entry is needed. A soft keyboard is a keyboard that replaces the physical keyboard on electronic devices 200 having touch-sensitive displays. Hence, in electronic devices 200 that have a touch-sensitive display a physical keyboard is optional. The output devices may for example include one or more speakers and/or one or more audio output connections for connection to external speaker(s), headphones or earphones. Optionally, the input devices may further include an audio input device (e.g., a microphone) to capture audio (e.g., speech). Still further, the input devices may also optionally comprise audio recognition device(s) to recognize audio (e.g., speech), which in combination with a microphone, may for example supplement or replace the keyboard.

In an embodiment, such as in the example embodiment illustrated in FIG. 3A, the user interface 230 includes a display that comprises a touch-sensitive surface. An exemplary user interface 230 of the electronic device 200 is hence schematically illustrated in FIG. 3A. Certain information 234 may be displayed at the user interface 230. In this example embodiment, this information 234 serves the sole purpose of guiding the user 600 when operating the electronic device 200, e.g., to make a subsequent user selection. For example, the user 600 may be presented with information 234 telling the user 600 that it is Saturday and that it is 8 pm. Furthermore, the textual information "Tell us your situation. We'll make it a music moment" indicates to the user 600 that he or she is expected to make a selection from the list of selectable user preference options A (701), B (702), C (703), D (704) and E (705).

To this end, a visual array of one or several selectable user preference options A (701), B (702), C (703), D (704) and E (705) is displayed at the user interface 230. Each selectable user preference option A (701), B (702), C (703), D (704) and E (705) is associated with a respective mood, i.e. an emotional state. In the embodiment shown in FIG. 3A, the different moods are exemplified by the following mood examples: "I'm having a party", "Hanging out with friends", "Road trip", "Party". It should be appreciated that other mood examples are also conceivable, and thus, displayable. For example, other mood examples include but are not limited to: "Happy", "Calm", "Energetic", and "Depressed", etc. Furthermore, each selectable user preference option A (701), B (702), C (703), D (704) and E (705) is further associated with a predefined energy level. Typically, but not necessarily, positive moods may be associated with higher energy levels as compared with negative moods. Or said differently, negative moods may be associated with lower energy levels as compared with positive moods.

In the following, it should be assumed that an audio stream is being played. For example, a user 600 may listen to the thus played audio stream through one or more loudspeakers of the user interface 230 of the electronic device 200. Alternatively, or in addition to, the user 600 may operate the electronic device 200 to remotely control external loudspeaker(s) 500-1 as described earlier such that the user and others may listen to the played audio stream through loudspeaker(s) 500-1, e.g. at a social gathering.

Turning now to FIG. 3B, a user 600 may e.g. perform a first control gesture. The first control gesture may for example be a hovering gesture (e.g., by the user's finger or by means of a stylus) over the display area of the display of the user interface 230 to approach, and eventually reach, the display area of a desired selectable user preference option (in this example user preference option D (704), i.e. "Party").

As can be seen in FIGS. 3B and 3C, upon reaching the display area corresponding to the desired user preference option, i.e. user preference option D (704) in this example, the user 600 may further perform another, i.e. second, control gesture. For example, the second control gesture may be a press gesture or tap gesture within the display area corresponding to the desired user preference option. This press gesture or tap gesture within the display area corresponding to the desired user preference option may be interpreted by the electronic device 200 to be a request, or instruction, to select the thus pressed, or tapped, user preference option (i.e., user preference option D (704) "Party" in this example). In this embodiment, the above-mentioned press gesture or tap gesture may be interpreted by the electronic device 200 to be a request, or instruction, to adjust an energy level of a currently played audio stream in accordance with the selected user preference option. In response to receiving this request, the electronic device 200 can adjust the energy level of a currently played audio stream in dependence of the selected user preference option. In other words, the electronic device 200 receives a request, or instruction, to select one of the selectable user preference options (i.e., user preference option D (704), i.e. "Party" in this example). The energy level of the played audio stream is then adjusted in response to receiving this request, or instruction.

In some embodiments, adjusting the energy level of the currently played audio stream comprises the electronic device 200 sending a data message to the computer server system 300 (see FIG. 2). This data message may comprise i) information about the selected user preference option (i.e., user preference option D (704), i.e. "Party" in this example), ii) information about the energy level associated with the selected user preference option, and iii) an instruction to manipulate the energy level of the audio stream that is being played in accordance with the energy level associated with the selected user preference option. Accordingly, the computer server system 300 may be configured to receive a data message including an instruction from an electronic device 200 to manipulate the energy level of an audio stream that is being played, e.g. by the electronic device 200. Furthermore, the computer server system 300 may be configured to manipulate the energy level of said audio stream, and in response thereto stream, or otherwise communicate, said audio stream with the manipulated energy level to the electronic device 200. Accordingly, the electronic device 200 is configured to receive the audio stream with the thus manipulated energy level. In some embodiments, the above-mentioned received data message comprises i) information about a selected user preference option (i.e., user preference option D (704), i.e. "Party" in this example), ii) information about the energy level associated with the selected user preference option, and iii) an instruction to manipulate the energy level of the audio stream that is being played in accordance with the energy level associated with the selected user preference option. Thus, the step, or action, of manipulating the energy level of said audio stream may comprise manipulating the energy level to correspond to the energy level, which is associated with the selected user preference option. In some embodiments, upon receiving the data message including the instruction from the electronic device 200 to manipulate the energy level of an audio stream that is being played 200, the computer server system 300 may perform an acoustic analysis of the audio stream being played to determine an energy level parameter associated with the audio stream being played and manipulate the determined energy level parameter to give the audio stream being played a different energy level parameter associated with a different energy level. For example, in one embodiment, performing this acoustic analysis of the audio stream being played may further comprise sensing, or otherwise determining, one or several acoustical parameters associated with the audio stream being played and determining the energy level parameter on the basis of said sensed, or otherwise determined, acoustical parameters.

In the embodiments described with reference to FIG. 3A-3C, the energy level of the played audio stream is indicative of an intensity of the played audio stream. For example, the energy level of the played audio stream may be indicative of a tempo of the played audio stream. The tempo of the played audio stream may be defined as the speed, or pace, at which the audio stream is being played. For example, the tempo may be measured in Beats Per Minute (BPM). Hence, the embodiments described with reference to FIG. 3A-3C may allow for adjustments of the tempo of currently played songs.

The embodiments described with reference to FIG. 3A-3C may allow for an improved playback of streamed audio, e.g. at social gatherings such as parties. The embodiments described with reference to FIGS. 3A-3C may for example allow for a user of the electronic device 200 to dynamically control the energy level (e.g., a tempo) of streamed audio (e.g., a song) that is being played based on a user preference such as a mood, i.e. an emotional state. Thus, in one example scenario, a party host (i.e., the user) may dynamically control the tempo of currently played songs on the basis of the current mood of the people at the party. This may improve the experience of the people at social gatherings such as parties.

With further reference to FIGS. 4A-4F, another example embodiment will now be described. This embodiment is similar to the embodiment described with reference to FIGS. 3A-3C. Similar to the embodiment in FIGS. 3A-3C, certain information 234 may be displayed at the user interface 230. This information 234 may for example serve the sole purpose of guiding the user 600 when operating the electronic device 200, e.g., to make a user selection.

Figure 4A:
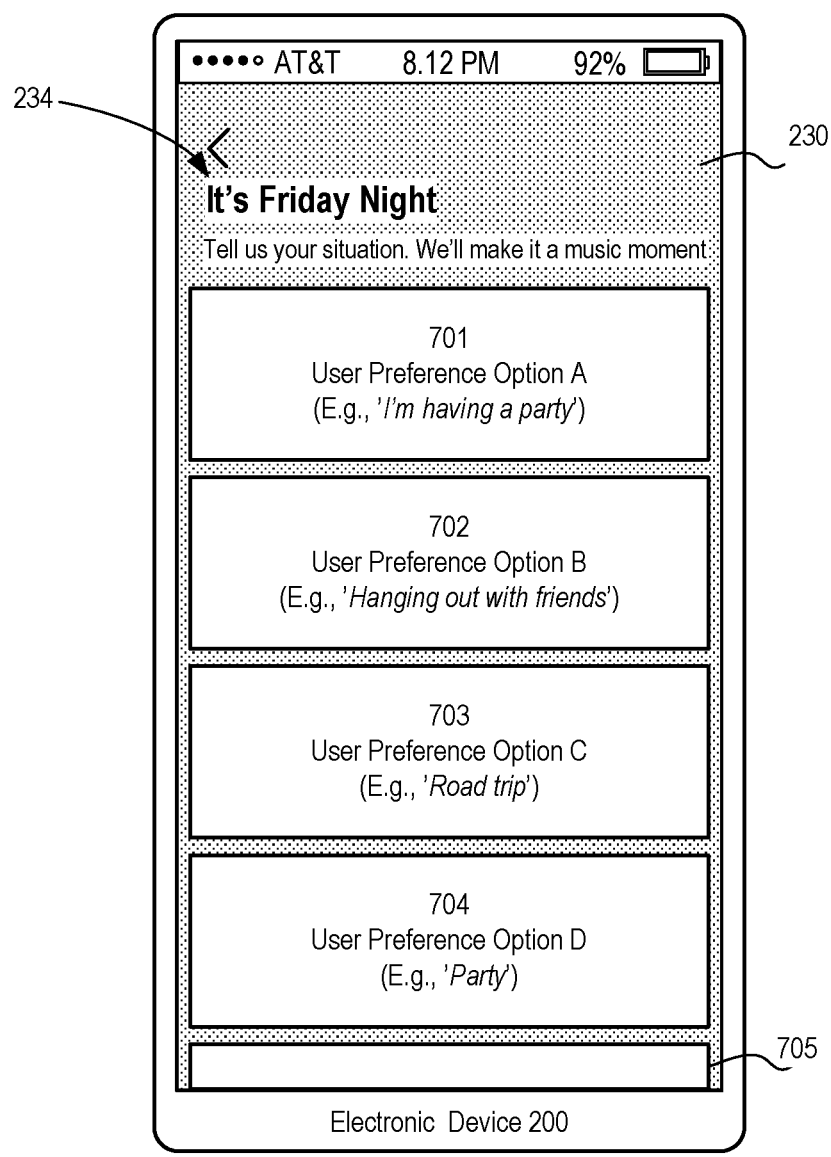
FIGS. 4A-4F schematically illustrates an example embodiment of a user interface of an electronic device, e.g. in the form of a smart phone, which supports playback of an audio stream and simultaneous dynamic control of an energy level of the audio stream.

For example, as can be seen in FIG. 4A, the user may be presented with information 234 that it is Friday night. Furthermore, the textual information "Tell us your situation. We'll make it a music moment" indicates to the user 600 that he or she is expected to make a selection from the list of selectable user preference options A (701), B (702), C (703), D (704) and E (705). Similar to the embodiment described with reference to FIG. 3A-3C, a visual array of one or several selectable user preference options A (701), B (702), C (703), D (704) and E (705) is hence displayed. In this embodiment, each selectable user preference option A (701), B (702), C (703), D (704) and E (705) is associated with a respective genre. In the embodiment shown in FIG. 4A, the different genres are exemplified by the following examples: "I'm having a party", "Hanging out with friends", "Road trip", "Party". It should be appreciated that other genres are also conceivable, and thus, displayable. For example, other genres include but are not limited to music genres such as RnB, Hip hop, Soul, Pop, Classical music, to name a few music genre examples.

Figure 4B:
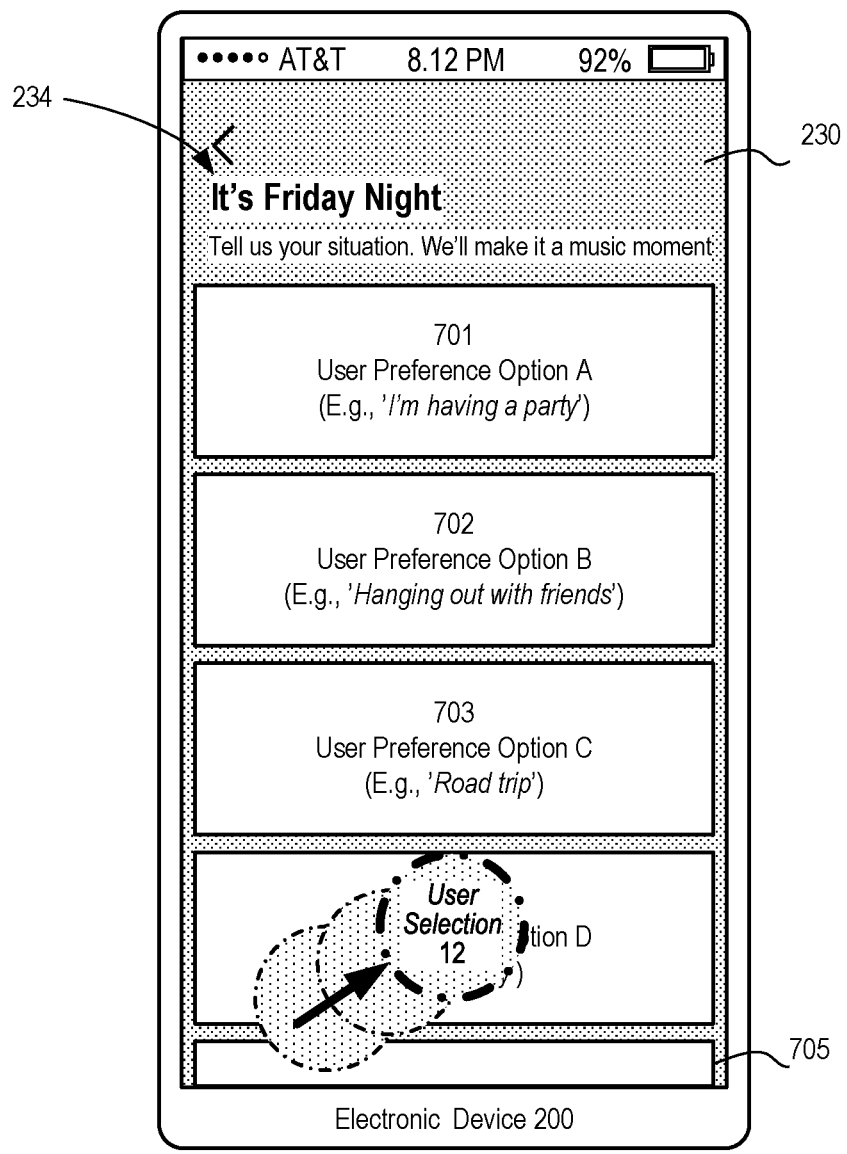
Figure 4C:
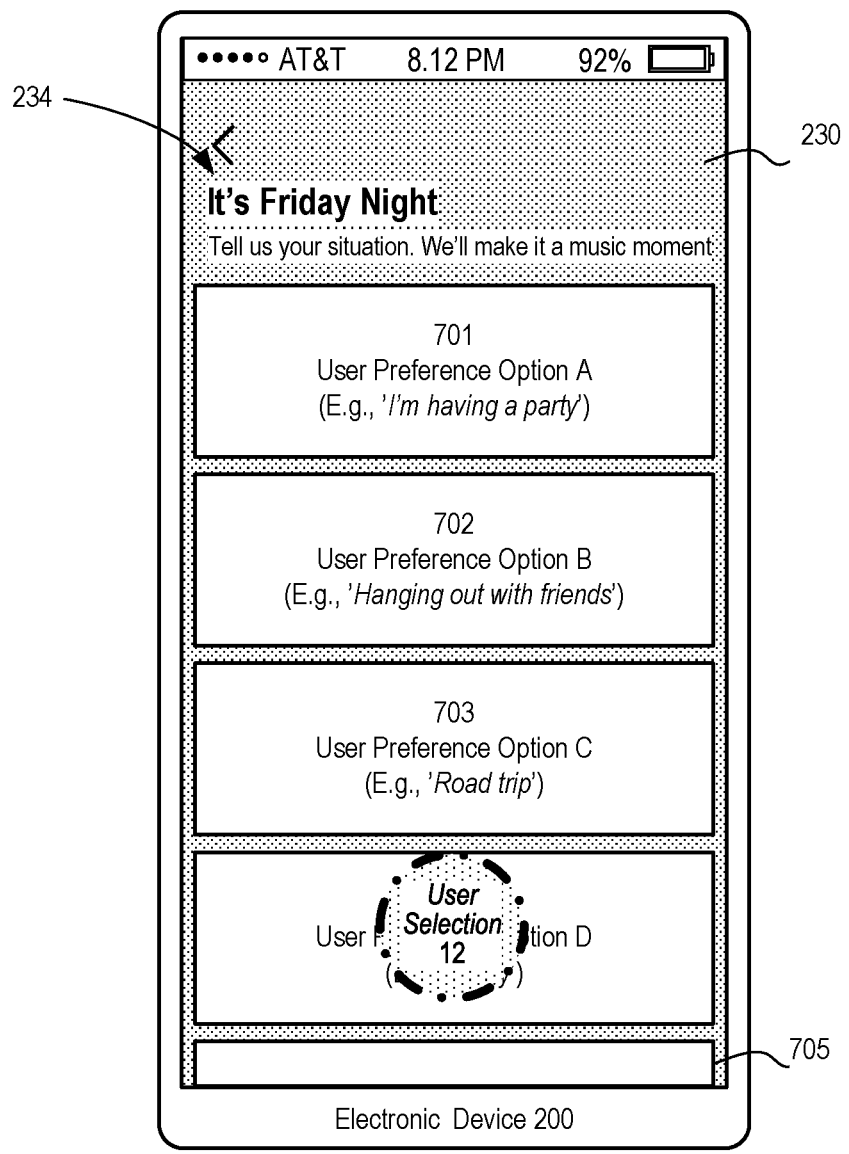

Turning now to FIG. 4B, a user 600 may e.g. perform a first control gesture. The first control gesture may for example be a hovering gesture (e.g., by the user's finger or by means of a stylus) over the display area of the display of the user interface 230 to approach, and eventually reach, the display area of a desired selectable user preference option (in this example user preference option D (704), i.e. "Party"). As can be seen in FIGS. 4B and 4C, upon reaching the display area corresponding to the desired user preference option, i.e. user preference option D (704) in this example, the user 600 may further perform another, i.e. second, control gesture. For example, the second control gesture may be a press gesture or tap gesture within the display area corresponding to the desired user preference option. This press gesture or tap gesture within the display area corresponding to the desired user preference option may be interpreted by the electronic device 200 to be a request, or instruction, to select the thus pressed, or tapped, user preference option (i.e., user preference option D (704), i.e. "Party", in this example). In this embodiment, the above-mentioned press gesture or tap gesture may be interpreted by the electronic device 200 to be a request, or instruction, to select the genre associated with the thus pressed, or tapped, user preference option, i.e. user preference option D (704), i.e. "Party" in this example. Still further, in some embodiments, the above-mentioned press gesture or tap gesture may be interpreted by the electronic device 200 to be a request, or instruction, to begin playback of one or more audio streams associated with the selected genre. For example, each selectable user preference option may be associated with an automatically generated playlist that is generated by the computer server system 300 and which is, furthermore, corresponding to the selected genre. There exist various techniques for generating suggested playlists on the basis of different factors, which are known in the art. For example, the US Patent Application Publication No. 2014/0280181 A1 describes some techniques for generating playlists that could be used. The generation of playlists is not a main focus of this disclosure and will therefore not be described in further detail herein.

Figure 4D:
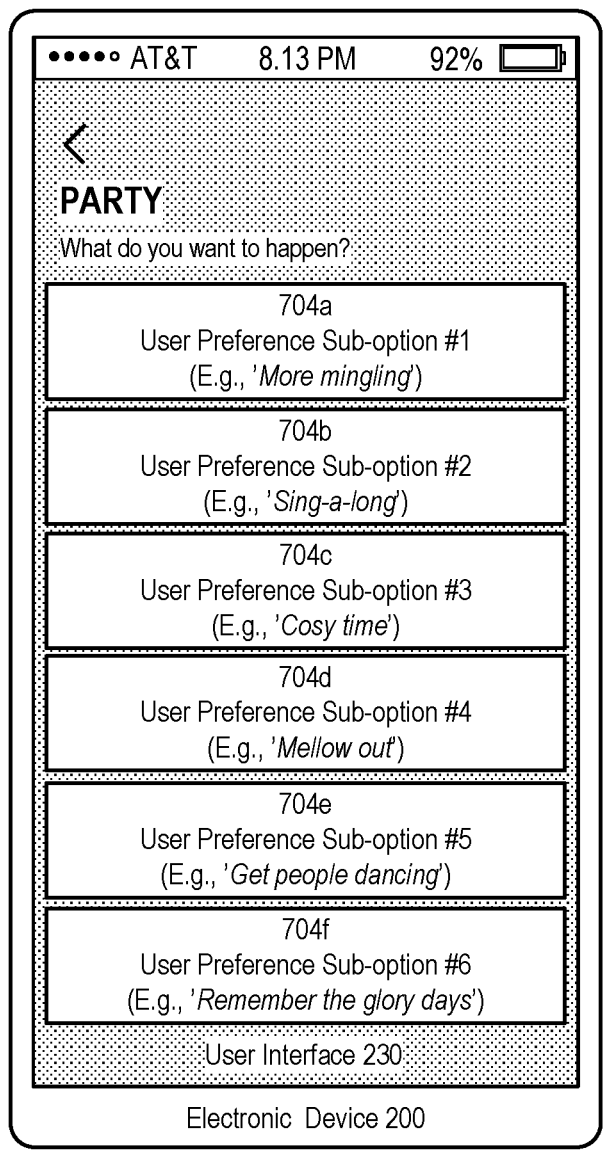

Turning now to FIG. 4D, upon a user selection 12 of the user preference option D (704), i.e. "Party", a new visual array of one or several selectable user preference sub-options 704a, 704b, 704c, 704d, 704e and 704f can be displayed at the user interface 230. Each one of the selectable user preference options 704a, 704b, 704c, 704d, 704e and 704f is further associated with a predefined energy level. The energy level of the played audio stream is typically, but not necessarily, indicative of an intensity of a played audio stream. For example, the energy level of a played audio stream may be indicative of a tempo of the played audio stream. The tempo of the played audio stream may for instance be defined as the speed, or pace, at which the audio stream is being played. For example, the tempo may be measured in BPM, as described earlier. In some embodiments, positive moods may be associated with higher energy levels as compared to negative moods. Or said differently, negative moods may be associated with lower energy levels as compared to positive moods. Furthermore, some moods (such as the user preference option 704c, i.e. 'Cosy time') may have a comparatively lower energy level than other moods (such as the user preference option 704e, i.e. 'Get people dancing'). That is, a lower tempo (e.g. in terms of BPM) may be suitable for some moods (such as 'Cosy time') whereas comparatively higher tempos may be suitable in other moods (such as 'Get people dancing'). The exact energy level (e.g. tempo) for the various mood options should preferably be tested and evaluated in each specific case e.g. in dependence of system requirements and/or user demands.

Figure 4E:
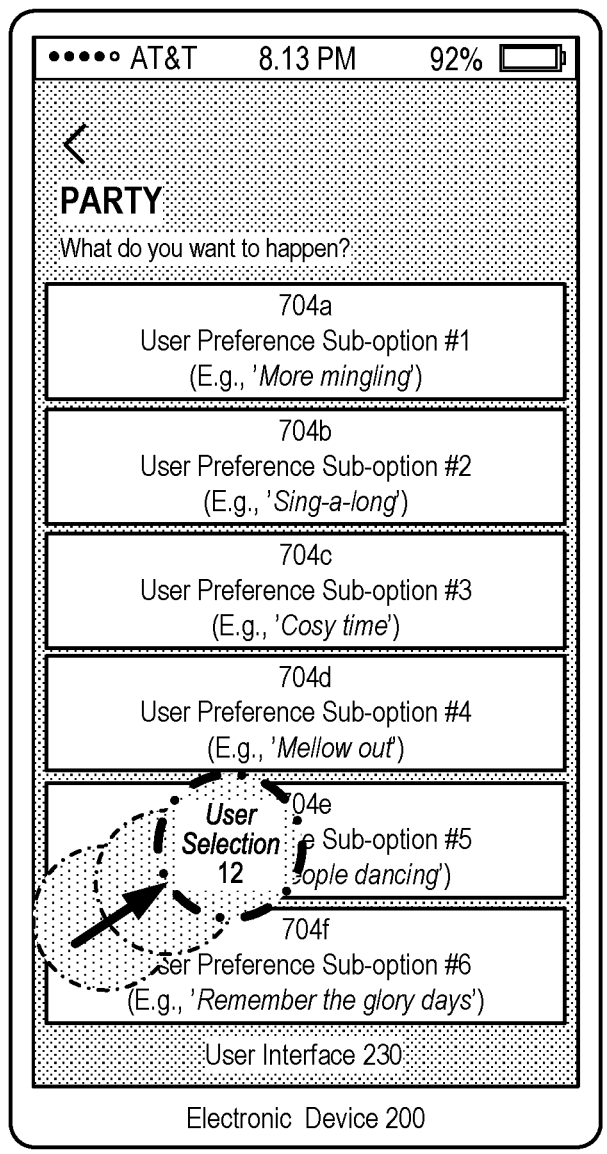

With further reference to FIG. 4E, a user 600 may continue operating the electronic device 200 by performing still another, i.e. a third, control gesture. The third control gesture may for example be a hovering gesture (e.g., by the user's finger or by means of a stylus) over the display area of the display of the user interface 230 to approach, and eventually reach, the display area of a desired user preference option (in this example user preference sub-option #5 (704e), i.e. "Get people dancing").

Figure 4F:
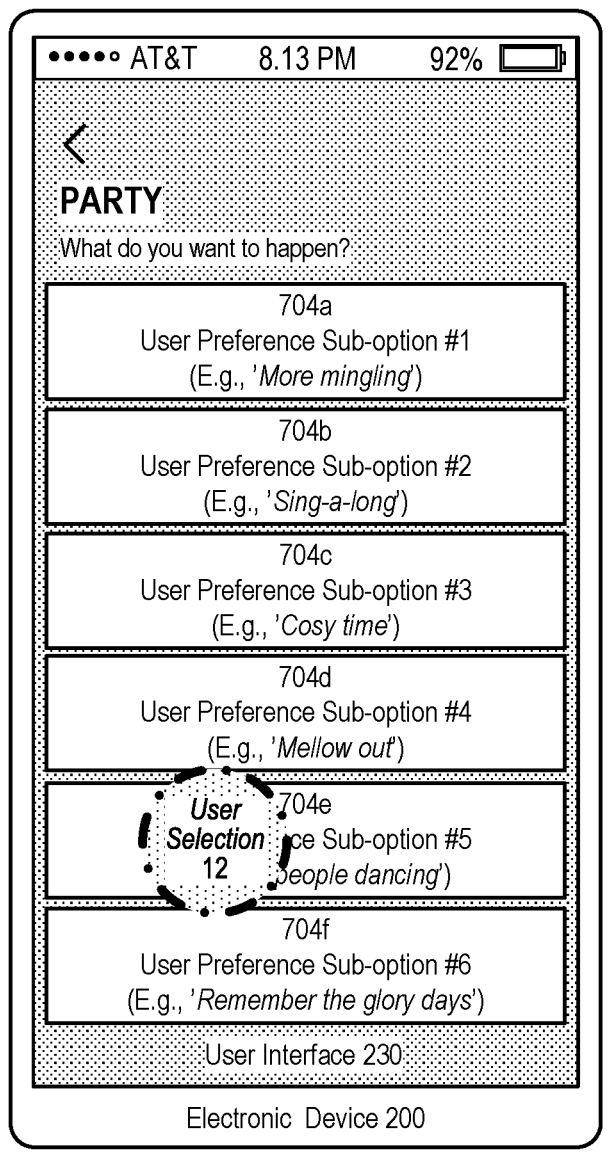

As can be seen in FIGS. 4E and 4F, upon reaching the display area corresponding to the desired user preference option, i.e. user preference sub-option #5 (704e) in this example, the user 600 may further perform another, i.e. fourth, control gesture. For example, the fourth control gesture may be a press gesture or tap gesture within the display area corresponding to the desired user preference option. This press gesture or tap gesture within the display area corresponding to the desired user preference option may be interpreted by the electronic device 200 to be a request, or instruction, to select the thus pressed, or tapped, user preference option (user preference sub-option #5 (704e), "Get people dancing", in this example). In this embodiment, the above-mentioned fourth control gesture, i.e. the press gesture or tap gesture, may be interpreted by the electronic device 200 to be a request, or instruction, to adjust an energy level of the currently played audio stream in accordance with the selected user preference option, i.e. user preference sub-option #5 (704e), "Get people dancing", in this example. In response to receiving this request, the electronic device 200 can adjust the energy level of a currently played audio stream in dependence of the selected user preference option. In other words, the electronic device 200 receives a request, or instruction, to select one of the selectable user preference options (i.e. user preference sub-option #5 (704e) in this example). The energy level of the played audio stream is then adjusted in response to receiving this request, or instruction.

In some embodiments, adjusting the energy level of the currently played audio stream comprises the electronic device 200 sending a data message to the computer server system 300. This data message may comprise i) information about the selected user preference option (i.e., user preference sub-option #5 (704e) in this example), ii) information about the energy level associated with the selected user preference option, and iii) an instruction to manipulate the energy level of the audio stream that is being played in accordance with the energy level associated with the selected user preference option.

Accordingly, the computer server system 300 may be configured to receive a data message including an instruction from an electronic device 200 to manipulate the energy level of an audio stream that is being played by the electronic device 200. Furthermore, the computer server system 300 may be configured to manipulate the energy level of said audio stream, and in response thereto stream, or otherwise communicate, said audio stream with the manipulated energy level to the electronic device 200. Accordingly, the electronic device 200 is configured to receive the audio stream with the thus manipulated energy level.

In some embodiments, the above-mentioned received data message comprises i) information about a selected user preference option (i.e., user preference sub-option #5 (704e) in this example), ii) information about the energy level associated with the selected user preference option, and iii) an instruction to manipulate the energy level of the audio stream that is being played in accordance with the energy level associated with the selected user preference option. Thus, the step, or action, of manipulating the energy level of said audio stream may comprise manipulating the energy level to correspond to said energy level associated with the selected user preference option. In some embodiments, upon receiving the data message including the instruction from the electronic device 200 to manipulate the energy level of an audio stream that is being played 200, the computer server system 300 may perform an acoustic analysis of the audio stream being played to determine an energy level parameter associated with the audio stream being played and manipulate the determined energy level parameter to give the audio stream being played a different energy level parameter associated with a different energy level. For example, in one embodiment, performing this acoustic analysis of the audio stream being played may further comprise sensing, or otherwise determining, one or several acoustical parameters associated with the audio stream being played and determining the energy level parameter on the basis of said sensed, or otherwise determined, acoustical parameters.

The embodiments described with reference to FIGS. 4A-4F may allow for an improved playback of streamed audio, e.g. at social gatherings such as parties. The embodiment described with reference to FIGS. 4A-4F may for example allow a user of the electronic device 200 to dynamically control the energy level (e.g., a tempo measured in BPM) of streamed audio (e.g., a song) that is being played based on a user preference such as a mood. Thus, in one example scenario, a party host (i.e., the user) may dynamically control the tempo of currently played songs on the basis of the current mood of the people at the party. This may improve the experience of the people at social gatherings such as parties.

Figure 5A:
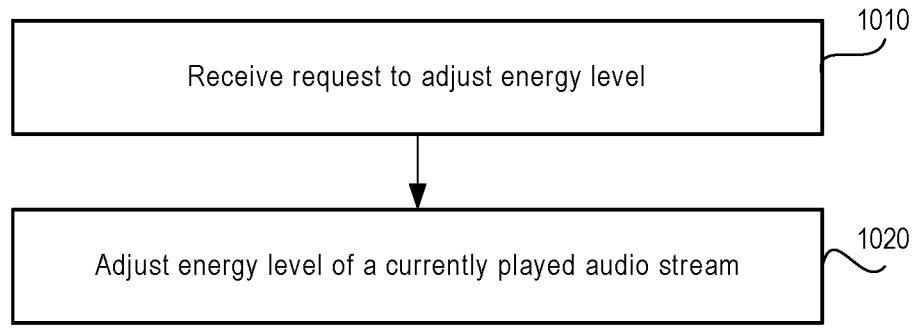
FIGS. 5A-5B schematically illustrate flowcharts of a method in accordance with an embodiment.
Figure 5B:
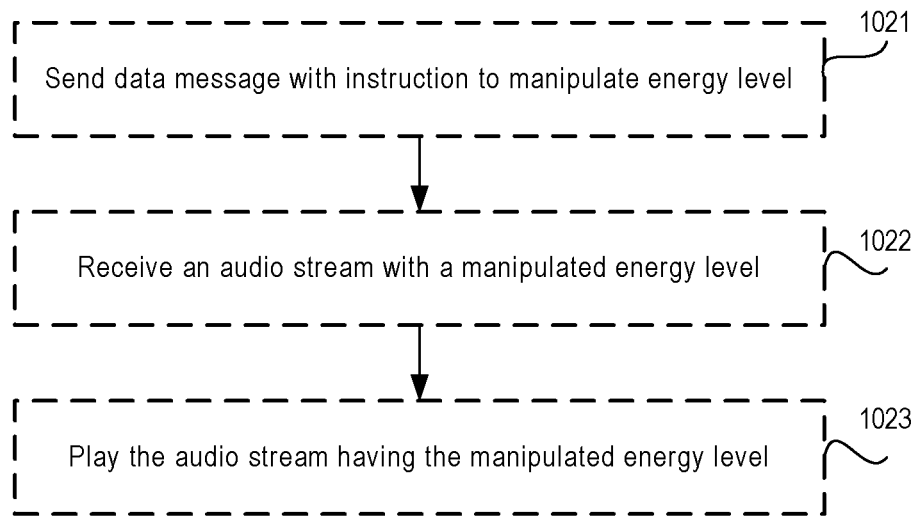

With reference to FIGS. 5A-5B, an embodiment of a method 1000 of operating an electronic device for playback of audio streams will now be described. While an audio stream is being played (e.g., at a user interface the electronic device or, alternatively, through an external loudspeaker(s) 500-1 that is remotely controlled by the electronic device (see FIG. 1)), a first request to adjust an energy level of the played audio stream in accordance with a user preference is received 1010. Furthermore, in response to receiving this first request, the energy level of the played audio stream is adjusted 1020, or otherwise changed, in dependence of the user preference.

FIG. 5B illustrates an example embodiment of the adjustment 1020 of the energy level of the played audio stream. For example, a data message may be sent 1021, i.e. transmitted, to a computer server system, wherein said data message includes an instruction to manipulate the energy level of the audio stream that is being played. Furthermore, the audio stream with a manipulated energy level is received 1022, e.g. from the computer server system 300. Also, the audio stream with the manipulated energy level may be played 1023, e.g. at the user interface or, alternatively, through an external loudspeaker(s) 500-1 (see FIG. 1) that is remotely controlled by the electronic device.

Figure 6A:
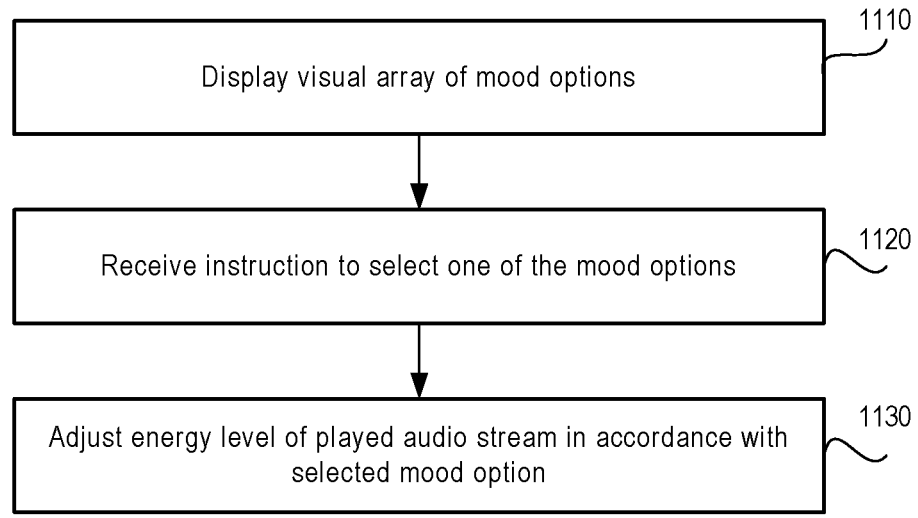
FIGS. 6A-6B schematically illustrate flowcharts of a method in accordance with an embodiment.
Figure 6B:
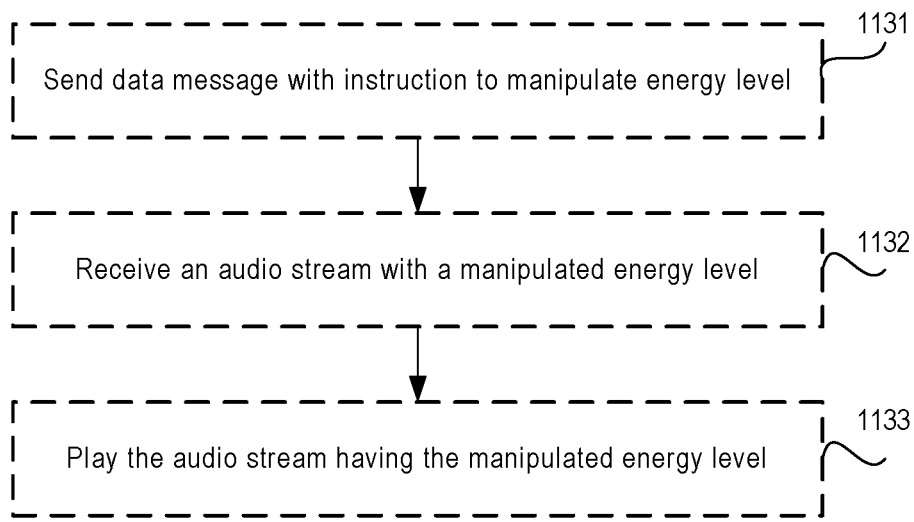

With reference to FIGS. 6A-6B, another embodiment of a method 1100 of operating an electronic device for playback of audio streams will now be described. While an audio stream is being played (e.g., at a user interface the electronic device or, alternatively, through an external loudspeaker that is remotely controlled by the electronic device), a visual array of selectable user preference options is displayed 1110 at the user interface. Each selectable user preference option is typically associated with a respective mood (i.e., an emotional state). Furthermore, each selectable user preference option is associated with a predefined energy level. Thus, each predefined energy level corresponds to a specific user preference option. Furthermore, an instruction (or, request) to select one of the selectable user preference options is received 1120. Still further, the energy level of the played audio stream is adjusted 1130 in response to receiving this instruction to select one of the selectable user preference options. More particularly, the energy level of the played audio stream is adjusted 1130 in accordance with the thus selected mood option.

FIG. 6B illustrates an example embodiment of the adjustment 1130 of the energy level of the played audio stream. For example, a data message may be sent 1131 to a computer server system. This data message may for example comprise:
information about a selected user preference option,
information about the energy level associated with the selected user preference option, and
an instruction to manipulate the energy level of the audio stream that is being played in accordance with the energy level associated with the selected user preference option.

Furthermore, the audio stream with a manipulated energy level may be received 1132, e.g. from the computer server system 300. Also, the audio stream with the manipulated energy level may be played 1133, e.g. at the user interface of the electronic device or, alternatively, through an external loudspeaker(s) 500-1 (see FIG. 1) that is remotely controlled by the electronic device.

Figure 7A:
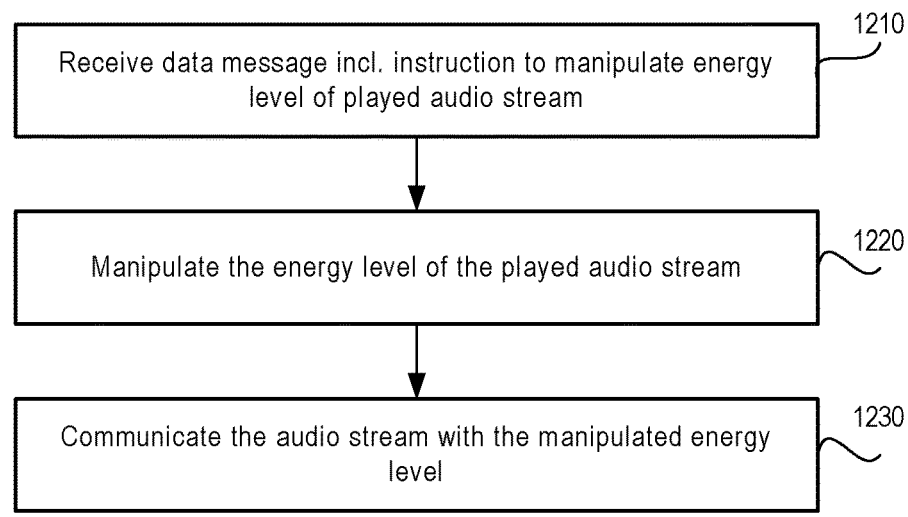
FIG. 7A-7C schematically illustrate flowcharts of a method in accordance with an embodiment.

Turning now to FIG. 7, an example embodiment of a method 1200 for adjusting an energy level of audio streams will be described. The method 1200 may be performed by a computer server system including one or several computer servers. That is, the method may be performed by, or otherwise executed in, one single computer server or a plurality of servers in a distributed manner. A distributed computer server system solution with two or more computer servers may have the advantage of task sharing among the different computer servers that are involved such that the different computer servers perform different actions, or method steps, of the method 1200.

A data message is received 1210, wherein said data message includes an instruction from an electronic device to manipulate the energy level of an audio stream that is being played. In response thereto, the energy level of said audio stream is manipulated 1220. Also, the audio stream with the manipulated energy level is streamed 1230, or otherwise communicated, to the electronic device.

In some embodiments, the above-mentioned data message may comprise:
information about a selected user preference option,
information about the energy level associated with the selected user preference option, and
an instruction to manipulate the energy level of the audio stream that is being played in accordance with the energy level associated with the selected user preference option.

In such embodiments, manipulating 1230 the energy level of said audio stream comprises manipulating the energy level to correspond to said energy level associated with the selected user preference option.

Figure 7B:
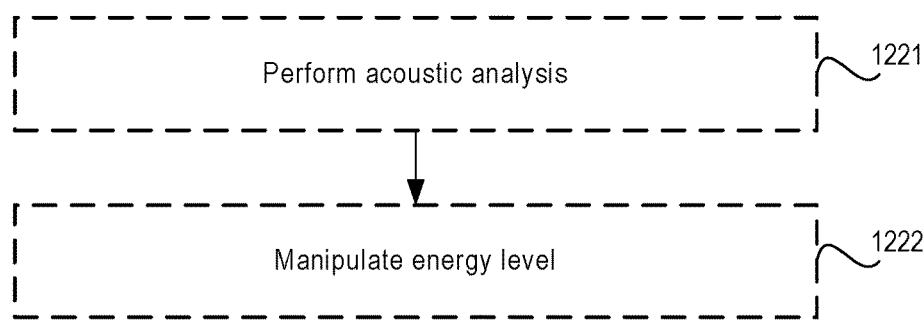
Figure 7C:
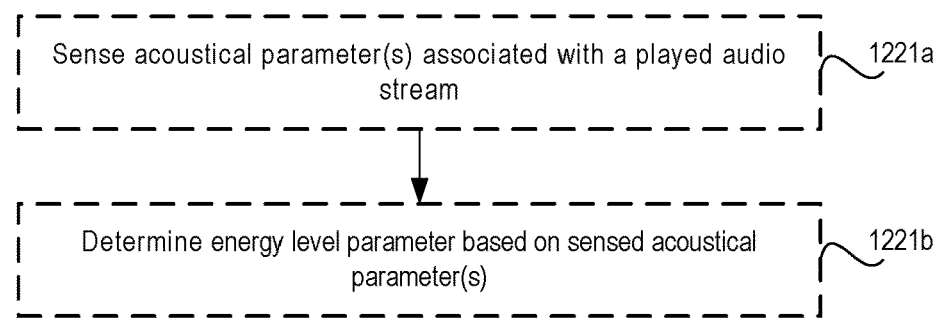

FIG. 7B schematically illustrates an example embodiment of manipulating 1220 the energy level of the earlier-mentioned audio stream. An acoustic analysis of the audio stream that is being played is performed 1221. The acoustic analysis may be carried out in order to determine an energy level parameter associated with the audio stream that is being played. Furthermore, the thus determined energy level parameter may be manipulated 1222, or otherwise adjusted, to give the audio stream being played a different energy level parameter associated with a different energy level. In other words, a different energy level parameter may be applied to the currently played audio stream. In one embodiment, which is schematically illustrated in FIG. 7C, performing the acoustic analysis of the audio stream being played further comprises sensing 1221a, or otherwise determining, one or several acoustical parameters associated with the audio stream being played; and determining 1221b the energy level parameter on the basis of the thus sensed, or otherwise determined, acoustical parameters.

Figure 8:
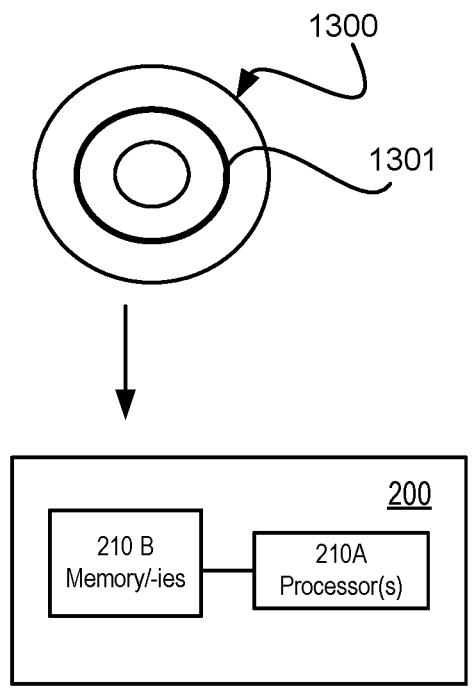
FIG. 8 illustrates a carrier comprising a computer program, in accordance with an embodiment.

Turning now to FIG. 8, still another embodiment will be briefly discussed. FIG. 8 shows an example of a computer-readable medium, in this example in the form of a data disc 1300. In one embodiment the data disc 1300 is a magnetic data storage disc. The data disc 1300 is configured to carry instructions 1301 that can be loaded into a memory 210B of an electronic device 200. Upon execution of said instructions by a processor 210A of the electronic device 200, the electronic device 200 is caused to execute a method or procedure according to any one of the embodiments described in conjunction with FIGS. 5 and 6, respectively. The data disc 1300 is arranged to be connected to or within and read by a reading device (not shown), for loading the instructions into the processor. One such example of a reading device in combination with one (or several) data disc(s) 1300 is a hard drive. It should be noted that the computer-readable medium can also be other mediums such as compact discs, digital video discs, flash memories or other memory technologies commonly used. In such an embodiment the data disc 1300 is one type of a tangible computer-readable medium. The instructions may alternatively be downloaded to a computer data reading device, such as an electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such an embodiment, the computer-readable signal is one type of a non-tangible computer-readable medium.

Figure 9:
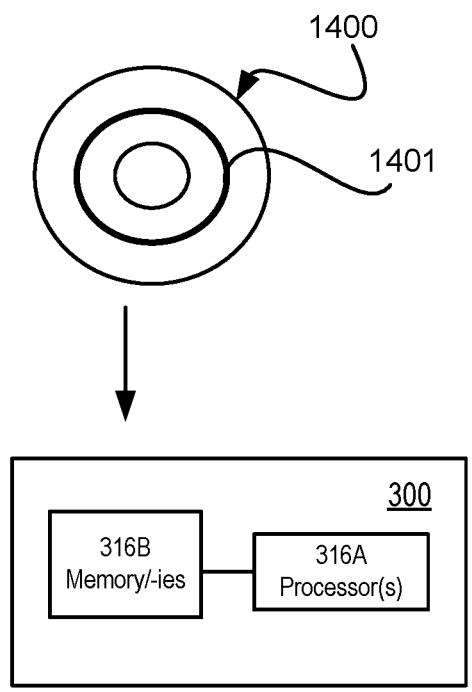
FIG. 9 illustrates a carrier comprising a computer program, in accordance with an embodiment.

Turning now to FIG. 9, yet another embodiment will be briefly discussed. FIG. 9 shows an example of a computer-readable medium, in this example in the form of a data disc 1400. In one embodiment the data disc 1400 is a magnetic data storage disc. The data disc 1400 is configured to carry instructions 1401 that can be loaded into a memory 316B of a computer server system 300. Upon execution of said instructions by a processor 316A of the computer server system 300, the computer server system 300 is caused to execute a method or procedure according to any one of the embodiments described in conjunction with FIG. 7. The data disc 1400 is arranged to be connected to or within and read by a reading device (not shown), for loading the instructions into the processor. One such example of a reading device in combination with one (or several) data disc(s) 1400 is a hard drive. It should be noted that the computer-readable medium can also be other mediums such as compact discs, digital video discs, flash memories or other memory technologies commonly used. In such an embodiment the data disc 1400 is one type of a tangible computer-readable medium. The instructions may alternatively be downloaded to a computer data reading device, such as a computer server system 300 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 316A of the computer server system 300. In such an embodiment, the computer-readable signal is one type of a non-tangible computer-readable medium.

Figure 10:
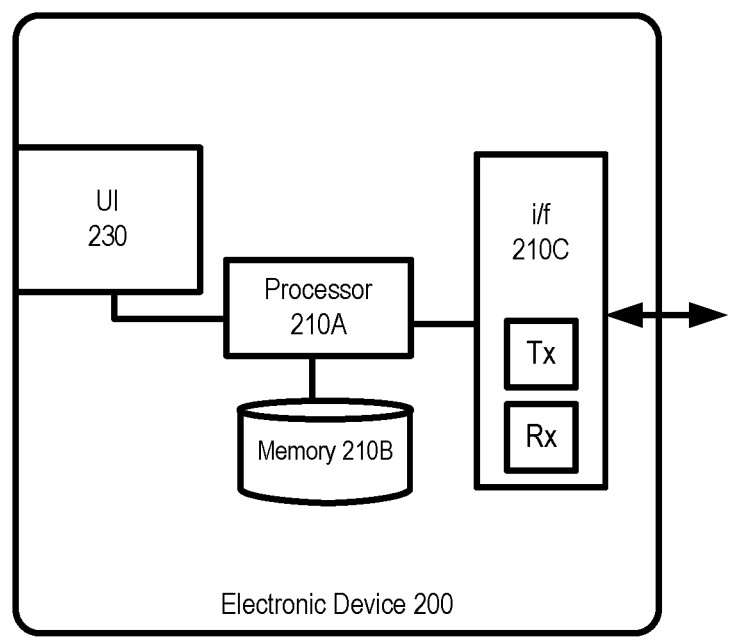
FIG. 10 illustrates an example implementation of an embodiment of an electronic device as illustrated in any one of FIGS. 1-4.

With reference to FIG. 10, an example implementation of the electronic device 200 of FIGS. 1-4 will be described in some further detail. For example, the electronic device 200 may be implemented as a stationary electronic device, such as a stationary computer. Alternatively, the electronic device 200 may be embodied as a portable electronic device, such as a mobile telephone, a cellular telephone, a tablet computer, a laptop computer, or a personal digital assistant.

In some embodiments, the electronic device 200 may comprise means adapted to perform the method described herein with reference to FIGS. 5 and 6. In one embodiment, the electronic device 200 thus comprises means adapted to receive (while an audio stream is being played) a first request to adjust an energy level of the played audio stream in accordance with a user preference, as well as means adapted to adjust the energy level of the played audio stream in dependence of the user preference, in response to receiving the first request.

In some embodiments, the electronic device 200 may further comprise means adapted to send a data message including an instruction to a computer server system to manipulate the energy level of the audio stream that is being played as well as means adapted to receive the audio stream with a manipulated energy level. Also, the electronic device 200 may comprise means adapted to play the audio stream with the manipulated energy level.

In some embodiments, the electronic device 200 may further comprise means adapted to display a visual array of selectable user preference options at the user interface, wherein each selectable user preference option is associated with a respective mood and wherein each selectable user preference option is further associated with a predefined energy level; and means adapted to receive an instruction to select one of the selectable user preference options. The means adapted to adjust the energy level of the played audio stream may be configured to adjust the energy level of the played audio stream in response to receiving the instruction to select one of the selectable user preference options.

Still further, the electronic device 200 may additionally comprise means adapted to send a data message to a computer server system, the data message comprising i) information about a selected user preference option, ii) information about the energy level associated with the selected user preference option, and iii) an instruction to manipulate the energy level of the audio stream that is being played in accordance with the energy level associated with the selected user preference option.

With continued reference to FIG. 10, an example implementation of the electronic device 200 will now be described. The electronic device 200 is configured to execute, or otherwise perform, any of the methods described herein with reference to FIGS. 5 and 6. As is schematically illustrated in FIG. 10, the electronic device 200 comprises hardware 210A-C. For example, the electronic device 200 may comprise one or more processors 210A and one or more memories 210B. Also, a communications interface 210C may be provided in order to allow the electronic device 200 to communicate with other electronic devices and/or computer servers 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the electronic device 200 to communicate with other devices and/or computer servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. Thus, the electronic device 200 may be configured to remotely control media presentation system(s) 500 as described earlier hereinabove. The electronic device 200 may further comprise a user interface 230, which may be comprised of a display and a keypad. Advantageously, the user interface 230 includes a touch-sensitive display as described earlier in this disclosure. As such, the touch-sensitive display may be a touch screen display upon which virtual keys may be displayed and operated. Furthermore, the user interface 230 may include output means such as loudspeakers (not shown) and/or one or several audio output connections as described earlier herein. As described with reference to FIG. 2, the electronic device 200 may also comprise one or more applications, e.g. the media playback application 220. These applications may include sets of instructions (e.g., computer program code) that when executed by the one or more processors 210A controls the operation of the electronic device 200.

In some implementations, the one or more memories 210B stores computer program code, which, when run in the one or more processors 210A causes the electronic device

200 to receive a first request to adjust an energy level of a currently played audio stream in accordance with a user preference, and in response to thereto, adjust the energy level of the played audio stream in dependence of the user preference.

In some implementations, the one or more memories 210B stores computer program code, which, when run in the one or more processors 210A causes the electronic device 200 to send, by means of the transmitter 210C, a data message including an instruction to a computer server system to manipulate the energy level of the audio stream that is being played; and receive, by means of the receiver 201C, the audio stream with a manipulated energy level.

Also, the one or more memories 210B may store computer program code, which, when run in the one or more processors 210A causes the electronic device 200 to play the audio stream with the manipulated energy level In some advantageous implementations, the one or more memories 210B may further store computer program code, which, when run in the one or more processors 210A causes the electronic device 200 to display, at the user interface 230, a visual array of selectable user preference options, wherein each selectable user preference option is associated with a respective mood and wherein each selectable user preference option is further associated with a predefined energy level; and receive an instruction to select one of the selectable user preference options; wherein adjusting the energy level of the played audio stream is performed in response to receiving the instruction to select one of the selectable user preference options.

In some implementations, the one or more memories 210B may further store computer program code, which, when run in the one or more processors 210A causes the electronic device 200 to send, by means of the transmitter 210C, a data message to a computer server system, the data message comprising i) information about a selected user preference option, ii) information about the energy level associated with the selected user preference option, and iii) an instruction to manipulate the energy level of the audio stream that is being played in accordance with the energy level associated with the selected user preference option; and receive, by means of the receiver 210C, the audio stream with the manipulated energy level.

Figure 11:
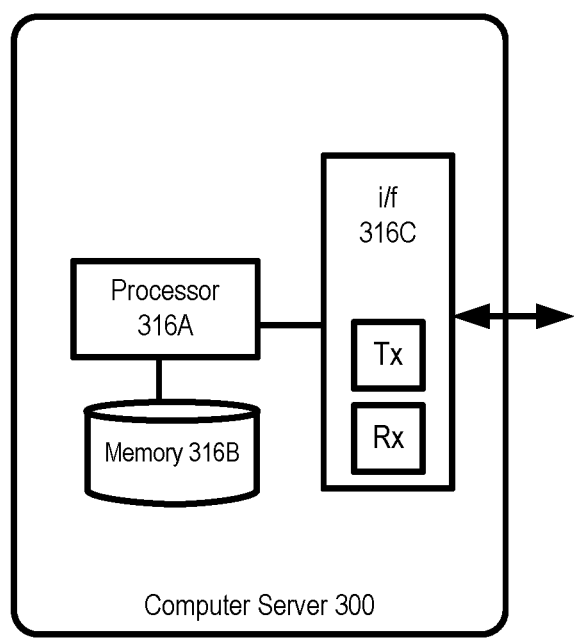
FIG. 11 illustrates an example implementation of an embodiment of an electronic device as illustrated in any one of FIGS. 1-2.

With reference to FIG. 11, an example embodiment of the computer server system 300 of FIGS. 1 and 2 will be described in some further detail. For example, the computer server system 300 shown in FIG. 1 may comprise one or several computer servers, as described earlier. Furthermore, the computer server system 300 may comprise means adapted to perform the method described herein with reference to FIG. 7. In one embodiment, the computer server system 300 may thus comprise means adapted to receive a data message including an instruction from an electronic device to manipulate the energy level of an audio stream that is being played; means adapted to manipulate the energy level of said audio stream; and means adapted to stream, or otherwise communicate, said audio stream with the manipulated energy level to the electronic device.

In some embodiments, the computer server system 300 may comprise means adapted to receive a data message from the electronic device, the data message comprising a) information about a selected user preference option, b) information about the energy level associated with the selected user preference option, and c) an instruction to manipulate the energy level of the audio stream that is being played in accordance with the energy level associated with the selected user preference option. The means adapted to manipulate the energy level of said audio stream may be configured to manipulate the energy level to correspond to said energy level associated with the selected user preference option.

In some embodiments, the computer server system 300 may additionally comprise means adapted to perform an acoustic analysis of the audio stream being played to determine an energy level parameter associated with the audio stream being played; and means adapted to manipulate the determined energy level parameter to give the audio stream being played a different energy level parameter associated with a different energy level. In some embodiments, the means adapted to perform the acoustic analysis may further comprise means adapted to sense, or otherwise determine, one or several acoustical parameters associated with the audio stream being played; and means adapted to determine the energy level parameter on the basis of said sensed, or otherwise determined, acoustical parameters.

With continued reference to FIG. 11, an example implementation of the computer server system 300 will now be described. The computer server system 300 is configured to execute, or otherwise perform, any of the methods described herein with reference to FIG. 7. The computer server system 300 is exemplified by a single computer server in order to ease the understanding of the disclosure. As is schematically illustrated in FIG. 11, the computer server 300 comprises hardware 316. For example, the computer server 300 may comprise one or more processors 316A and one or more memories 316B. Also, a communications interface 316C, or a communications circuitry, may be provided in order to allow the computer server 300 to communicate with electronic devices 200 and/or other servers 300, e.g. via a network 400 such as the Internet. To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the computer server 300 to communicate with electronic devices 200 and/or other servers 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As described with reference to FIG. 1, the computer server 300 may also comprise one or more applications, e.g. the software application 310 including the media server application 312. The applications are sets of instructions (e.g., computer program code) that when executed by the one or more processors 316A controls the operation of the computer server 300.

In some implementations, the one or more memories 316B may store computer program code, which, when run in the one or more processors 316A causes the computer server 300 to: receive, by means of the communications interface 316C, a data message including an instruction from an electronic device to manipulate the energy level of an audio stream that is being played; manipulate the energy level of said audio stream; and in response thereto stream, by means of the communications interface 316C, said audio stream with the manipulated energy level to the electronic device.

In some implementations, the one or more memories 316B may further store computer program code, which, when run in the one or more processors 316A causes the computer server 300 to: receive, by means of the communications interface 316C, a data message from the electronic device, the data message comprising i) information about a selected user preference option, ii) information about the energy level associated with the selected user preference option, and iii) an instruction to manipulate the energy level of the audio stream that is being played in accordance with the energy level associated with the selected user preference option; wherein manipulating the energy level of said audio stream comprises manipulating the energy level to correspond to said energy level associated with the selected user preference option.

In some implementations, the one or more memories 316B may further store computer program code, which, when run in the one or more processors 316A causes the computer server 300 to: perform an acoustic analysis of the audio stream being played to determine an energy level parameter associated with the audio stream being played; and manipulate the determined energy level parameter to give the audio stream being played a different energy level parameter associated with a different energy level.

In some implementations, the one or more memories 316B may further store computer program code, which, when run in the one or more processors 316A causes the computer server 300 to: sense, or otherwise determine, one or several acoustical parameters associated with the audio stream being played; and determine the energy level parameter on the basis of said sensed, or otherwise determined, acoustical parameters.

The various embodiments described throughout this disclosure may allow a user of an electronic device to dynamically control the energy level (e.g., the tempo) of a played audio stream (e.g., a song) on the basis of a user preference. In some advantageous embodiments, the user preference includes a mood. Thus, in one example scenario, a party host (i.e., a user) may dynamically control the tempo of currently played songs on the basis of the current mood of the people at a social gathering such as at a party. This may improve the experience of social gatherings such as parties. According to some embodiments, it may also be possible to influence the mood of people at a social gathering. For example, if a party host wishes to change the mood of the people at a social gathering, he or she may in some embodiments select a mood option to adjust the energy level of the played songs.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. As one mere example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice.

Furthermore, it should be appreciated that embodiments described in this disclosure could be advantageously combined with any one of the embodiments described in the co-filed U.S. patent application Ser. No. 14/714,145, filed on May 15, 2015, entitled "PLAYBACK OF MEDIA STREAMS AT SOCIAL GATHERINGS", inventors Souheil Medaghri Alaoui et al and/or in the co-filed U.S. patent application Ser. No. 14/714,153 filed on May 15, 2015, entitled "METHODS AND ELECTRONIC DEVICES FOR DYNAMIC CONTROL OF PLAYLISTS", inventors Souheil Medaghri Alaoui et al, both of which patent applications are incorporated herein by reference in their entirety.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of operating an electronic device for playback of an audio stream, the method comprising:
    displaying, at a user interface of the electronic device, a list of selectable user interface options, each of the selectable user interface options corresponding to a possible situation of a user of a computer system and associated with a first set of audio stream preferences;
    receiving a first request selecting a respective option of the list of selectable user interface options;
    in response to receiving the first request:
        beginning playback of an audio stream using the first set of audio stream preferences corresponding to the respective option; and
        displaying a list of sub-options for the possible situation corresponding to the respective option, each indicative of an adjustment to be made to the first set of audio stream preferences, wherein each sub-option in the list of sub-options is associated with a distinct second set of audio stream preferences; and
        in response to receiving a second request corresponding to the selection of a respective sub-option, adjusting the audio stream according to the distinct second set of audio stream preferences corresponding to the respective sub-option.

2. The method of claim 1, wherein adjusting the audio stream according to the distinct second set of audio stream preferences corresponding to selection of the respective sub-option comprises:
    sending a data message including an instruction to a computer server system to manipulate an audio stream preference of the audio stream that is being played using the distinct second set of audio stream preferences.

3. The method of claim 2, further comprising:
    playing the audio stream using the distinct second set of audio stream preferences corresponding to the respective sub-option.

4. The method of claim 1, wherein adjusting the audio stream according to the distinct second set of audio stream preferences corresponding to selection of the respective sub-option comprises:
    sending a data message to a computer server system, the data message comprising a) information about the selected sub-option, b) information about an energy level associated with the selected sub-option, and c) an instruction to manipulate an energy level of the audio stream that is being played in accordance with the energy level associated with the selected sub-option; and
    in response thereto, receiving the audio stream with the manipulated energy level.

5. The method of claim 4, further comprising:
    playing the audio stream with the manipulated energy level.

6. An electronic device for operating playback of an audio stream comprising:
    one or more processors; and
    memory storing one or more programs for execution by the one or more processors, the one or more programs comprising instructions for performing a set of operations, comprising:
        displaying, at a user interface of the electronic device, a list of selectable user interface options, each of the selectable user interface options corresponding to a possible situation of a user of a computer system and associated with a first set of audio stream preferences;
        receiving a first request selecting a respective option of the list of selectable user interface options;
        in response to receiving the first request:
            beginning playback of an audio stream using the first set of audio stream preferences corresponding to the respective option; and
            displaying a list of sub-options for the possible situation corresponding to the respective option, each indicative of an adjustment to be made to the first set of audio stream preferences, wherein each sub-option in the list of sub-options is associated with a distinct second set of audio stream preferences; and
            in response to receiving a second request corresponding to the selection of a respective sub-option, adjusting the audio stream according to the distinct second set of audio stream preferences corresponding to the respective sub-option.

7. The electronic device of claim 6, wherein adjusting the audio stream according to the distinct second set of audio stream preferences corresponding to selection of the respective sub-option comprises:
    sending a data message including an instruction to a computer server system to manipulate an audio stream preference of the audio stream that is being played using the distinct second set of audio stream preferences.

8. The electronic device of claim 7, wherein the one or more programs further comprises instructions for:
    playing the audio stream using the distinct second set of audio stream preferences corresponding to the respective sub-option.

9. The electronic device of claim 6, wherein adjusting the audio stream according to the distinct second set of audio stream preferences corresponding to selection of the respective sub-option comprises:
    sending a data message to a computer server system, the data message comprising a) information about the selected sub-option, b) information about an energy level associated with the selected sub-option, and c) an instruction to manipulate an energy level of the audio stream that is being played in accordance with the energy level associated with the selected sub-option; and
    in response thereto, receiving the audio stream with the manipulated energy level.

10. The electronic device of claim 9, the one or more programs comprising instructions for:
    playing the audio stream with the manipulated energy level.

11. A non-transitory computer-readable storage medium storing one or more programs configured for execution by an electronic device, the one or more programs comprising instructions for:
- displaying, at a user interface of the electronic device, a list of selectable user interface options, each of the selectable user interface options corresponding to a possible situation of a user of a computer system and associated with a first set of audio stream preferences;
- receiving a first request selecting a respective option of the list of selectable user interface options;
- in response to receiving the first request:
  - beginning playback of an audio stream using the first set of audio stream preferences corresponding to the respective option; and
  - displaying a list of sub-options for the possible situation corresponding to the respective option, each indicative of an adjustment to be made to the first set of audio stream preferences, wherein each sub-option in the list of sub-options is associated with a distinct second set of audio stream preferences; and
- in response to receiving a second request corresponding to the selection of a respective sub-option, adjusting the audio stream according to the distinct second set of audio stream preferences corresponding to the respective sub-option.

12. The non-transitory computer-readable storage medium of claim 11, further comprising instructions for:
- sending a data message including an instruction to a computer server system to manipulate an audio stream preference of the audio stream that is being played using the distinct second set of audio stream preferences.

13. The non-transitory computer-readable storage medium of claim 11, further comprising instructions for:
- playing the audio stream using the distinct second set of audio stream preferences corresponding to the respective sub-option.

14. The non-transitory computer-readable storage medium of claim 11, wherein adjusting the audio stream according to the distinct second set of audio stream preferences corresponding to selection of the respective sub-option comprises:
- sending a data message to a computer server system, the data message comprising a) information about the selected sub-option, b) information about an energy level associated with the selected sub-option, and c) an instruction to manipulate an energy level of the audio stream that is being played in accordance with the energy level associated with the selected sub-option; and
- in response thereto, receiving the audio stream with the manipulated energy level.

15. The non-transitory computer-readable storage medium of claim 11, further comprising instructions for:
- playing the audio stream with the manipulated energy level.

* * * * *